US012716641B2

(12) United States Patent
Lee et al.

(10) Patent No.: US 12,716,641 B2
(45) Date of Patent: Aug. 25, 2026

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS, INC., Seoul (KR)

(*) Notice: Subject to any disclaimer, the term of this patent is extended or adjusted under 35 U.S.C. 154(b) by 339 days.

(21) Appl. No.: 18/283,656

(22) PCT Filed: Mar. 15, 2022

(86) PCT No.: PCT/KR2022/003613

§ 371 (c)(1), (2) Date: Sep. 22, 2023

(87) PCT Pub. No.: WO2022/203266

PCT Pub. Date: Sep. 29, 2022

(65) Prior Publication Data

US 2024/0167754 A1 May 23, 2024

(30) Foreign Application Priority Data

Mar. 22, 2021 (KR) ........................ 10-2021-0036474

(51) Int. Cl.
*F25D 23/02* (2006.01)

(52) U.S. Cl.
CPC ...... *F25D 23/028* (2013.01); *E05Y 2201/412* (2013.01); *E05Y 2900/31* (2013.01); *F25D 2323/024* (2013.01)

(58) Field of Classification Search
CPC .. F25D 23/02; F25D 23/028; F25D 2323/024; E05F 1/1207; E05F 1/1215;
(Continued)

(56) References Cited

U.S. PATENT DOCUMENTS 3,722,937 A * 3/1973 Stoeckl .................... E05C 19/02 292/79
5,522,656 A * 6/1996 Jenkins ................. E05F 1/1246 292/79
(Continued)

FOREIGN PATENT DOCUMENTS

CN 201420457 3/2010
CN 101501428 12/2010
(Continued)

OTHER PUBLICATIONS

KR100781601 translation (Year: 2007).*
(Continued)

*Primary Examiner* — Hiwot E Tefera
(74) *Attorney, Agent, or Firm* — KED & Associates, LLP

(57) ABSTRACT

A refrigerator comprises: a cabinet which has a storage space; a hinge bracket coupled to the cabinet; a door rotatably coupled to a shaft provided in the hinge bracket and opens/closes the storage space; and an automatic closing device provided in the door at a position spaced apart from the rotational center line of the door, and during closing of the door, is operated to automatically close the door in cooperation with the hinge bracket, wherein the automatic closing device comprises: a lever which rotates about a rotational center line spaced apart from the rotational center line of the door; an elastic member connected to the lever; a body which is provided in the door to rotatably support the lever; and a locking member which, during opening of the door, restricts the rotation of the lever with respect to the body while the elastic member accumulates an elastic force.

20 Claims, 18 Drawing Sheets

(58) Field of Classification Search
CPC ........... E05Y 2900/31; E05Y 2201/412; E05Y 2201/484; E05Y 2201/624; E05Y 2201/638; E05D 7/081; E05D 11/1014; E05D 11/06
See application file for complete search history.

(56) References Cited

U.S. PATENT DOCUMENTS

| | | | | |
|---|---|---|---|---|
| 7,753,459 | B2 * | 7/2010 | Kappler | F25D 25/025 312/402 |
| 8,944,540 | B2 | 2/2015 | Kim et al. | |
| 2008/0203739 | A1 * | 8/2008 | Lim | E05C 19/04 292/340 |
| 2010/0095601 | A1 | 4/2010 | Ha | |
| 2013/0264930 | A1 * | 10/2013 | Kim | E05F 1/00 312/405 |
| 2015/0137674 | A1 * | 5/2015 | Choi | E05C 7/02 312/405 |
| 2018/0328092 | A1 * | 11/2018 | Qiu | E05F 5/027 |
| 2020/0217112 | A1 * | 7/2020 | Yun | E05B 79/20 |
| 2021/0025209 | A1 | 1/2021 | Kashiwaguma et al. | |

FOREIGN PATENT DOCUMENTS

| | | | | | |
|---|---|---|---|---|---|
| CN | 106123458 | A | * | 11/2016 | E05D 11/00 |
| CN | 103363755 | | | 9/2017 | |
| CN | 108193966 | A | * | 6/2018 | F25D 23/028 |
| CN | 209687133 | | | 11/2019 | |
| CN | 110822795 | A | * | 2/2020 | F25D 23/028 |
| CN | 113700404 | A | * | 11/2021 | F25D 23/028 |
| DE | 102013224272 | | | 5/2015 | |
| EP | 2397632 | | | 12/2011 | |
| KR | 0142056 | B1 | * | 7/1998 | |
| KR | 20-0318316 | | | 8/2003 | |
| KR | 10-0781601 | | | 12/2007 | |
| KR | 100819849 | B1 | * | 4/2008 | E05F 1/12 |
| KR | 100863598 | B1 | * | 10/2008 | F25D 23/028 |
| KR | 10-2008-0097980 | | | 11/2008 | |
| KR | 10-0874633 | | | 12/2008 | |
| KR | 10-2013-0114963 | | | 10/2013 | |
| WO | WO 2015/057020 | | | 4/2015 | |
| WO | WO-2016012577 | A1 | * | 1/2016 | F25D 23/028 |
| WO | WO 2022-030834 | | | 2/2022 | |
| WO | WO 2022-030835 | | | 2/2022 | |

OTHER PUBLICATIONS

English translation of KR100819849 (Year: 2008).*
CN108193966 translation (Year: 2018).*
Extended European Search Report dated Feb. 18, 2025, issued in Application No. 22775968.5.
International Search Report (with English Translation) dated Jun. 17, 2022 issued in Application No. PCT/KR2022/003613.
Chinese Office Action dated Mar. 14, 2026, issued in Application No. 202280023301.9.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2022/003613, filed Mar. 15, 2022, which claims priority to Korean Patent Application No. 10-2021-0036474, filed Mar. 22, 2021, whose entire disclosures are hereby incorporated by reference.

TECHNICAL FIELD

The present disclosure relates to a refrigerator.

BACKGROUND ART

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

The refrigerator may be independently placed in a kitchen or living room or may be accommodated in a space defined by a furniture cabinet of the kitchen.

The refrigerator tends to increase in size more and more, and multi-functions are provided to the refrigerator as dietary life changes and pursues high quality, and accordingly, refrigerators of various structures in consideration of user convenience are, brought to the market.

The refrigerator may include a cabinet defining a storage space and a door connected to the cabinet and having the storage space. A door storage portion for storing food may be provided in the door. When the door storage portion is provided, a lot of force is required for the user to close the door due to a weight of the food stored in the door storage portion as well as a weight of the door itself.

In order for the user to easily close the door, the recent refrigerator is provided with a hinge device for automatically closing the door when the door is closed at a certain angle.

An automatic return hinge device including a restoring device is disclosed in Korean Patent Registration No. 10-0874633, which is a prior document.

The hinge device may include a body, a clutch device mounted inside the body, a shaft coupled to pass through the clutch device, and a first spring that transmits restoring force to the shaft when the door is closed.

The shaft serves to provide a rotational center of the door, and the first spring in the form of a coil spring is disposed in a direction parallel to the shaft.

In the case of the prior document, since the restoration device is disposed in a direction parallel to the rotational center of the door, a space for positioning the restoration device as high as the height of the restoration device is required in the door, and thus, there is a restriction in installing the restoration device.

In addition, the position of the rotational center of the door may vary according to a thickness of the door, and when the thickness of the door becomes thin, it may be impossible to install the restoration device in a direction parallel to the rotational center of the door.

DISCLOSURE OF THE INVENTION

Technical Problem

Embodiments provide a refrigerator in which a user operates an auto closing device by rotating a door at a minimum angle when the door reaches a reference angle during a closing process so that the user closes the door with little force.

Optionally or additionally, embodiments provide a refrigerator in which, when a user removes force for closing a door in a process of closing the door, an auto closing device does not operate to prevent a phenomenon, in which the door is maintained in an opened state, from occurring.

Optionally or additionally, embodiments provide a refrigerator provided with an auto closing device installed in a door regardless of a thickness of a door to provide closing force of the door.

Technical Solution

A refrigerator according to one aspect may include a cabinet having a storage space. The refrigerator may further include a hinge bracket coupled to the cabinet. The refrigerator may further include a door rotatably coupled to a shaft provided on the hinge bracket and configured to open and close the storage space. The refrigerator further includes an auto closing device installed in the door.

The auto closing device may be disposed at a position spaced apart from a rotational center line of the door. The auto closing device may interact with the hinge bracket in a process of closing the door to automatically close the door.

The auto closing device may include a lever configured to rotate based on a rotational center line spaced apart from a rotational center line of the door. The auto closing device may further include an elastic member connected to the lever. The auto closing device may further include a body installed in the door to rotatably support the lever. The auto closing device may further include a locking member configured to restrict the rotation of the lever with respect to the body in a state in which the elastic member accumulates elastic force while the door is opened.

The locking member may be rotatably provided on the lever. The locking member may be coupled to the body while the door is opened.

The coupling of the locking member with the body may be released while the door is closed in the state in which the locking member is coupled to the body.

The rotational center line of the lever may extend in a first direction. The rotational center line of the locking member may extend in a second direction crossing the first direction. For example, the first direction may be a vertical direction. The second direction may be a horizontal direction.

An opening through which the locking member passes may be defined in the lever. A locking groove into which the locking member is accommodated may be provided in the body.

The auto closing device may further include a sliding member slidably provided on the lever.

When the door is closed in the state in which the locking member is inserted into the locking groove, the locking member may rotate an unlocking direction by the sliding member so that the locking member gets out of the locking groove.

The auto closing device may further include an elastic member configured to provide elastic force to the locking member so that the locking member rotates in an opposite direction of the unlocking direction.

The hinge bracket may include a coupling portion coupled to the cabinet. The hinge bracket may further include a bracket body extending in a horizontal direction from the coupling portion. The hinge bracket may further include a protruding pin protruding from the bracket body. The lever may include a pin slot in which the protruding pin is accommodated.

The pin slot may extend in a longitudinal direction of the lever.

The auto closing device may further include an elastic member configured to elastically support the sliding member. In a state in which external force is not applied to the sliding member, a portion of the sliding member may be disposed in the pin slot by elastic force of the elastic member.

While the door is closed after the door is opened at a reference angle or more, the protruding pin may be disposed in the pin slot so that the protruding pin presses the sliding member. The pressed sliding member may be configured to allow the locking member to rotate in the unlocking direction.

The lever may include a rib slot configured to guide the movement of the sliding member. The sliding member may include a guide rib inserted into the rib slot.

The locking member may be rotatably connected to the lever by a shaft. The shaft may be connected to the lever at a position lower than the sliding member.

The sliding member may move on the lever in a direction crossing the rotational center line of the lever.

The auto closing device may further include a connector configured to connect the elastic member to the lever. The connector may pass through the body in the body and is connected to the lever. The locking member may be installed on the lever to rotate together with the lever.

Advantageous Effects

According to the proposed embodiment, when the user rotates the door at the minimum angle at the time point at which the door reaches the reference angle, since the auto closing device operates to automatically close the door, the user may close the door with the little force.

In the state in which the locking of the lever is released, since the lever receives the elastic force of the elastic member, the door may be automatically closed by the elastic force of the elastic member without manually closing the door by the user. Therefore, in the process of closing the door, when the user releases the door, the phenomenon in which the door is maintained in the opened state may be prevented from occurring.

Since the auto closing device is disposed to be spaced apart from the rotational center line of the door, even when the thickness of the door is reduced, the closing force may be provided to the door when the door is closed.

MODE FOR CARRYING OUT THE INVENTION

Figure 1:
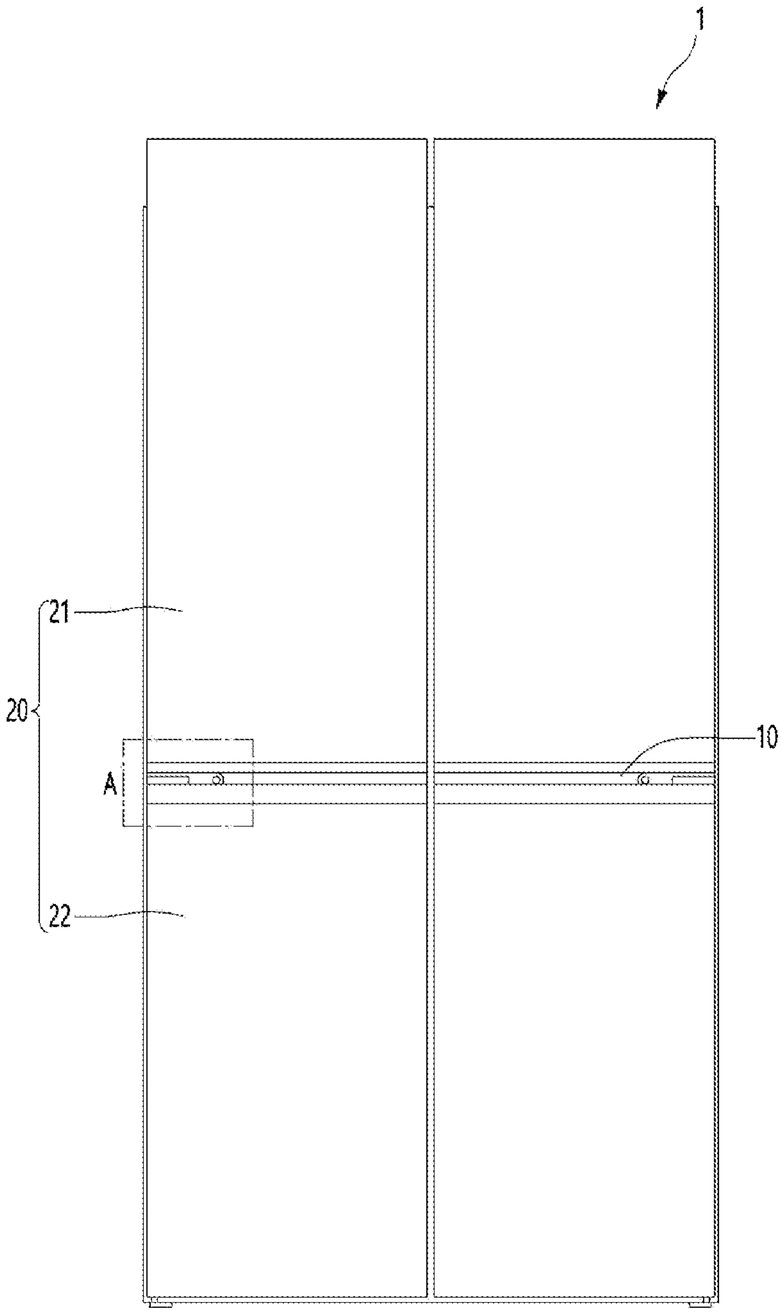
FIG. 1 is a perspective view of a beverage maker according to an embodiment.

Hereinafter, some embodiments of the present invention will be described in detail with reference to the accompanying drawings. It is noted that the same or similar components in the drawings are designated by the same reference numerals as far as possible even if they are shown in different drawings. In addition, in describing the embodiments of the present invention, if it is determined that a detailed description of a related known configuration or function disturbs understanding of the embodiment of the present invention, the detailed description will be omitted.

Also, in the description of the embodiments of the present invention, the terms such as first, second, A, B, (a) and (b) may be used. These terms are only used to distinguish the component from other components, and the essence, sequence, or order of the corresponding component is not limited by the term. It should be understood that when an element is described as being “connected,” “coupled”, or “joined” to another element, the former may be directly connected or jointed to the latter or may be “connected”, coupled” or “joined” to the latter with a third component interposed therebetween.

Figure 2:
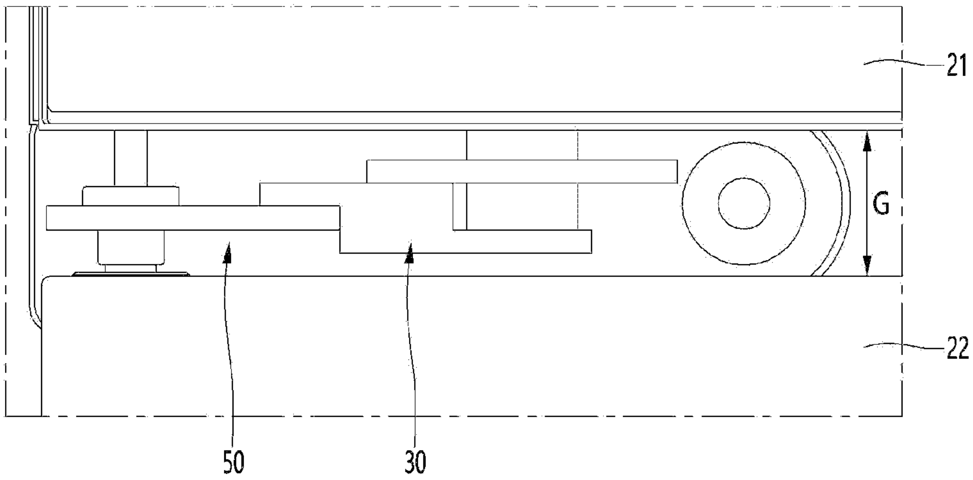
FIG. 2 is an enlarged view illustrating a portion A of FIG. 1.

FIG. 1 is a front view of a refrigerator according to an embodiment and FIG. 2 is an enlarged view illustrating a portion A of FIG. 1.

Referring to FIGS. 1 and 2, a refrigerator 1 according to an embodiment may be installed independently in a kitchen or installed in an indoor furniture cabinet. When the refrigerator 1 is installed in the indoor furniture cabinet, the refrigerator 1 may be installed alone or arranged side by side with the other refrigerator.

The refrigerator 1 may include a cabinet 10 having a storage space. The refrigerator 1 may include a refrigerator door 20 that opens and closes the storage space.

The storage space may not be limited, but may be divided into an upper first space and a lower second space. The refrigerator door 20 may also include a first door 21 that opens and closes the first space and a second door 22 that opens and closes the second space.

The first space may be a refrigerating compartment, and the second space may be a freezing compartment or vice versa. Alternatively, the storage space may include a first space and a second space, which are divided into left and right sides. Alternatively, the storage space may be a single space, and a single refrigerator door may open and close the storage space.

At least one or more of the first door 21 and the second door 22 may be a rotation type door. Alternatively, the single refrigerator door 20 may be a rotation type door.

In this embodiment, the rotation type refrigerator door 20 may include an auto closing device 40 that provides closing force to the refrigerator door 20 in a state in which the refrigerator door 20 is opened and then closed again at a certain angle.

In FIG. 2, an example in which the auto closing device 30 is provided in the first door of the first door and the second door, which are arranged in a vertical direction will be described. It should be noted that the position of the auto closing device 30 is not limited.

When the first door 21 and the second door 22 are arranged in the vertical direction, a hinge bracket 50 is provided between the first door 21 and the second door 22.

The hinge bracket 50 may be a common bracket that provides a rotational center of each of the first door 21 and the second door 22. Alternatively, the hinge bracket may be disposed at an upper side of the first door 21, and the hinge bracket may also be disposed at a lower side of the second door 22.

The hinge bracket 50 may be fixed to a front surface of the cabinet 10. The hinge bracket 50 may include a shaft member 550 (to be described later). The shaft member 550 may include a shaft for the first door 21 (to be described later) and a shaft for the second door 22 (to be described later).

A gap G having a predetermined size may be defined between the first door 21 and the second door 22. A portion of the hinge bracket 50 is disposed between the first door 21 and the second door 22 so that the first door 21 and the second door 22 rotate without interfering with each other. The hinge bracket 50 may be spaced apart from a top surface of the second door 22 The hinge bracket 40 may be spaced apart from a bottom surface of the first door 21.

The auto closing device 30 according to this embodiment may provide closing force to the first door 21 in a process of closing the first door 21 while acting with the hinge bracket 50. Alternatively, the auto closing device 30 may provide the closing force to the second door 22.

In order for the auto closing device 30 to provide the closing force to the first door 21, the auto closing device 30 may be installed in the first door 21.

For example, the auto closing device 30 may be installed at a lower side of the first door 21. In order to interact with the hinge bracket 30, a portion of the auto closing device 30 may protrude downward from the bottom surface of the first door 21.

When the auto closing device 30 is installed at the lower side of the first door 21, the auto closing device 30 may not be well seen from the outside while the first door 21 is opened and closed.

The auto closing device 30 may be spaced apart from a top surface of the second door 22 so that the auto closing device 30 does not interfere with the second door 22.

Figure 3:
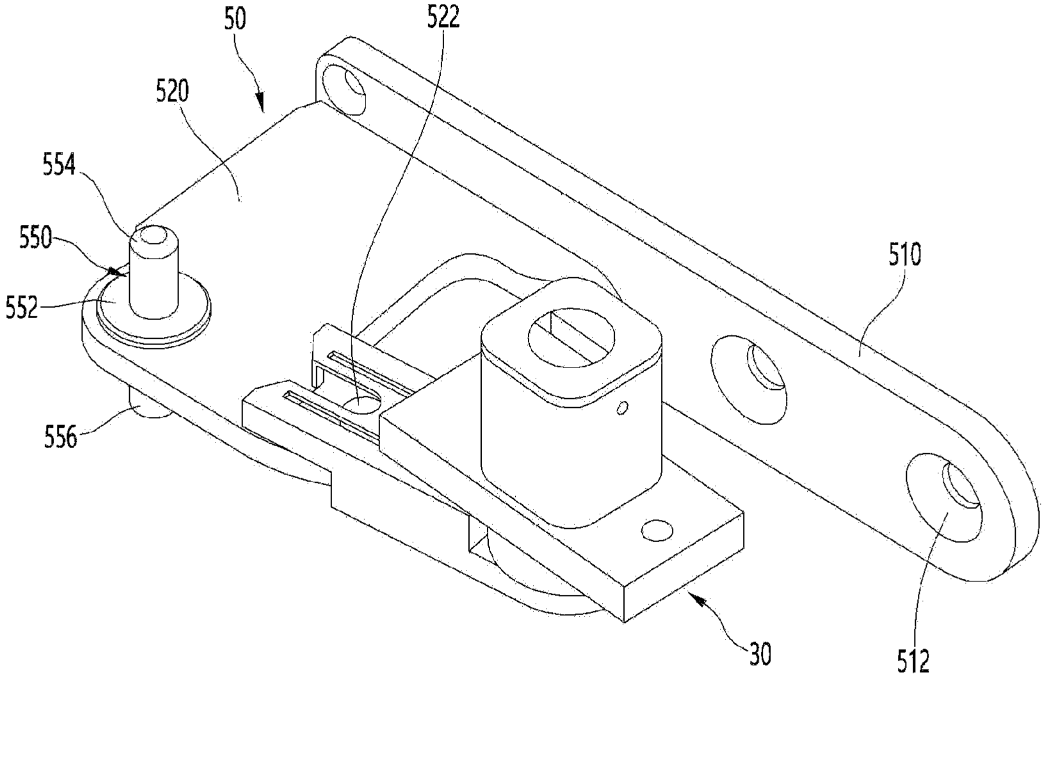
FIGS. 3 and 4 are perspective views illustrating relative positions of a hinge bracket and an auto closing device in a state in which the door is closed.
Figure 4:
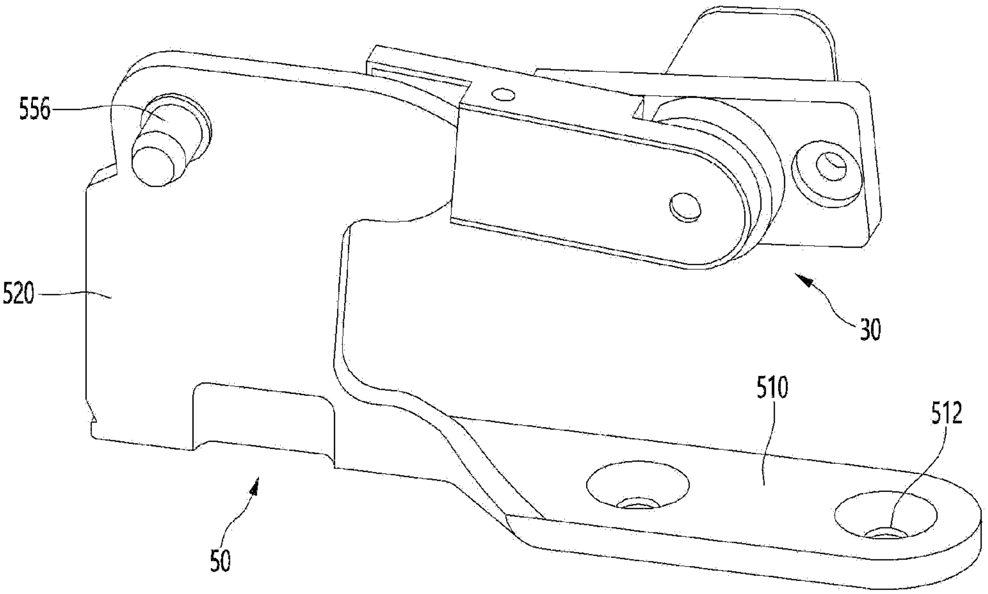
Figure 5:
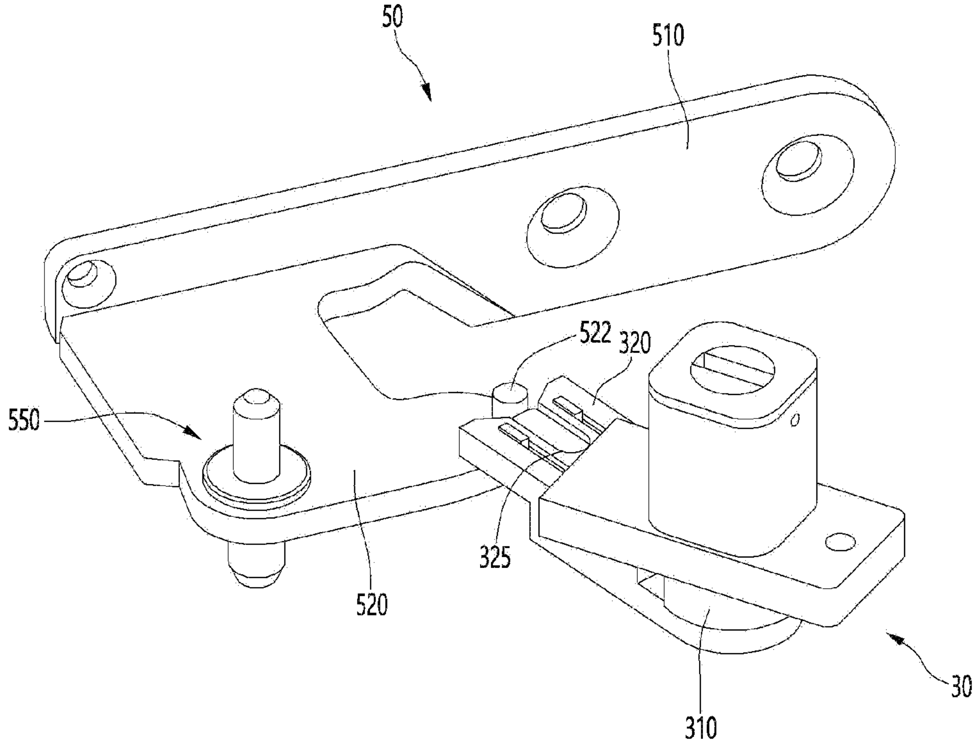
FIGS. 5 and 6 are perspective views illustrating relative positions of the hinge bracket and the auto closing device in a state in which the door is opened at a reference angle.
Figure 6:
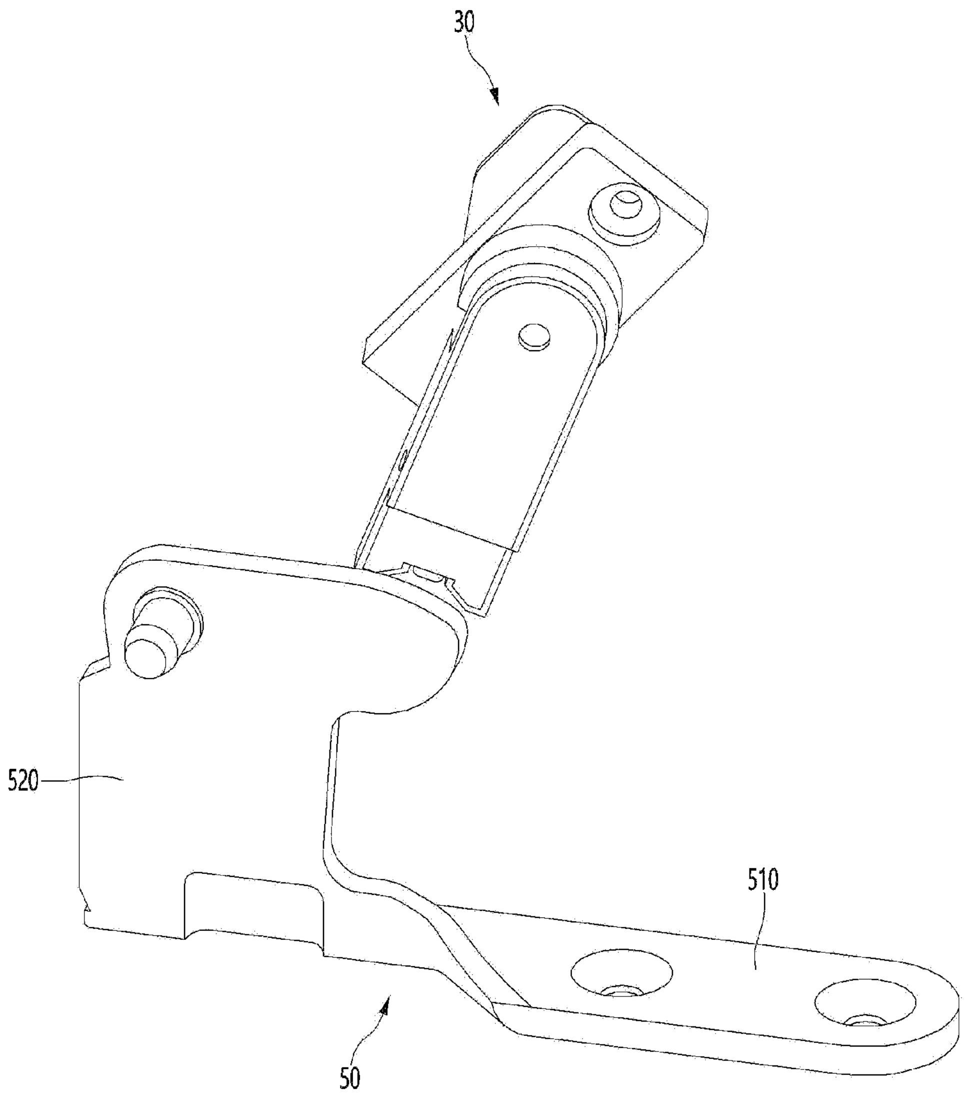

FIGS. 3 and 4 are perspective views illustrating relative positions of the hinge bracket and the auto closing device in a state in which the door is closed, and FIGS. 5 and 6 are perspective views illustrating relative positions of the hinge bracket and the auto closing device in a state in which the door is opened at a reference angle.

Referring to FIGS. 3 to 6, the hinge bracket 50 may include a coupling portion 510 to be coupled to the cabinet 10. The hinge bracket 50 may further include a bracket body 520 extending in a horizontal direction from the coupling portion 510.

The coupling portion 510 may include one or more coupling holes 512. A coupling member may be coupled to the cabinet 10 through the coupling holes 512.

A height of the bracket body 520 may be less than that of the coupling portion 510. A shaft member 550 may be coupled to the bracket body 520.

The shaft member 550 may include a seating portion 552 seated on the bracket body 520. The shaft member 550 may include a first shaft 554 extending upward from the seating portion 552. The shaft member 550 may further include a second shaft 556 extending downward from the seating portion 552.

A diameter of the seating portion 552 may be greater than that of the second shaft 556. A hole (not shown) through which the second shaft 556 passes may be defined in the bracket body 520.

The second shaft 556 may pass through a hole of the bracket body 520 from an upper side of the bracket body 520. The seating portion 552 may be seated on a top surface of the bracket body 520.

The first door 21 may be coupled to the first shaft 554. The second door 22 may be coupled to the second shaft 556. Thus, the first shaft 554 may provide a rotational center of the first door 21. The second shaft 556 may provide a rotational center of the second door 22.

The auto closing device 30 may be disposed at a position spaced apart from the first shaft 554 in the horizontal direction. That is, the auto closing device 30 may be coupled to the first door 21 at a position spaced apart from the first shaft 554.

The auto closing device 30 may rotate together with the first door 21. The auto closing device 30 may interact with the bracket body 520 in a process of closing the first door 21 to provide the closing force to the first door 21.

Hereinafter, the auto closing device 30 will be described in detail.

Figure 7:
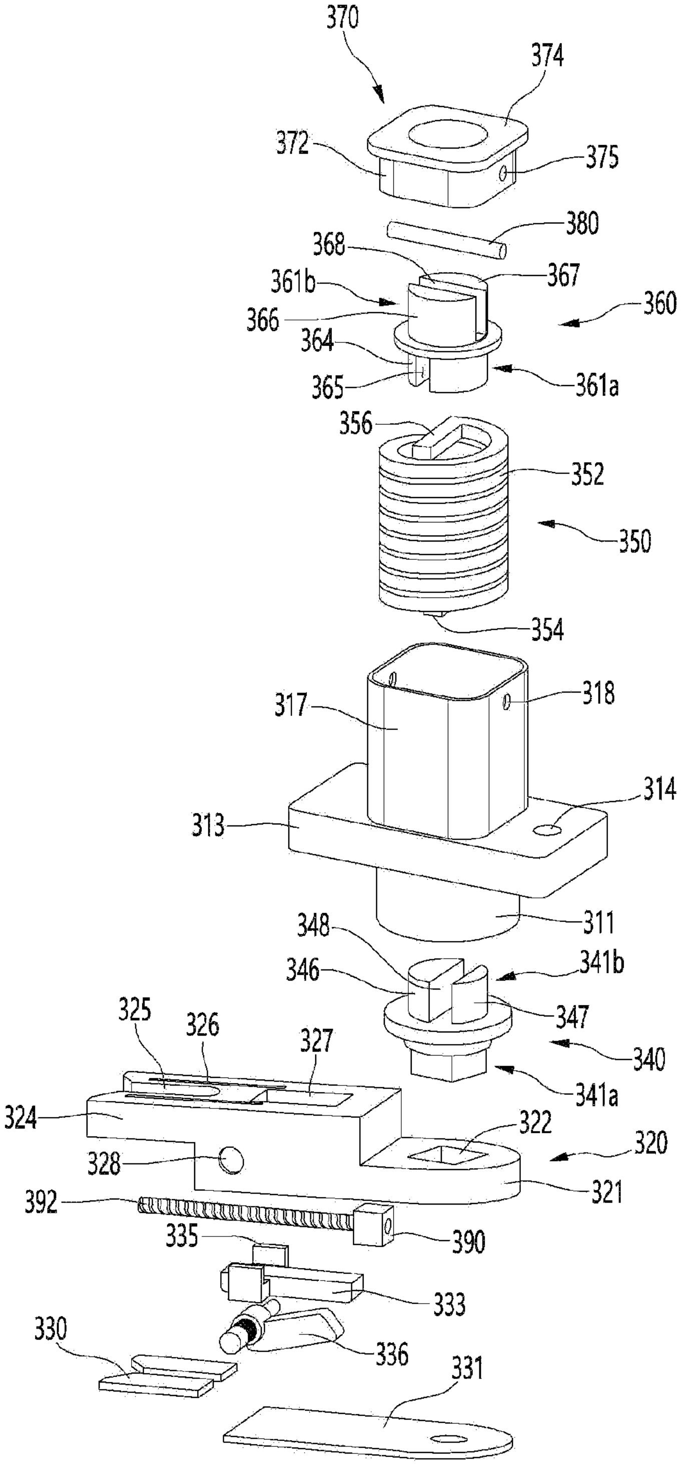
FIG. 7 is an exploded perspective view of the auto closing device according to an embodiment.
Figure 8:
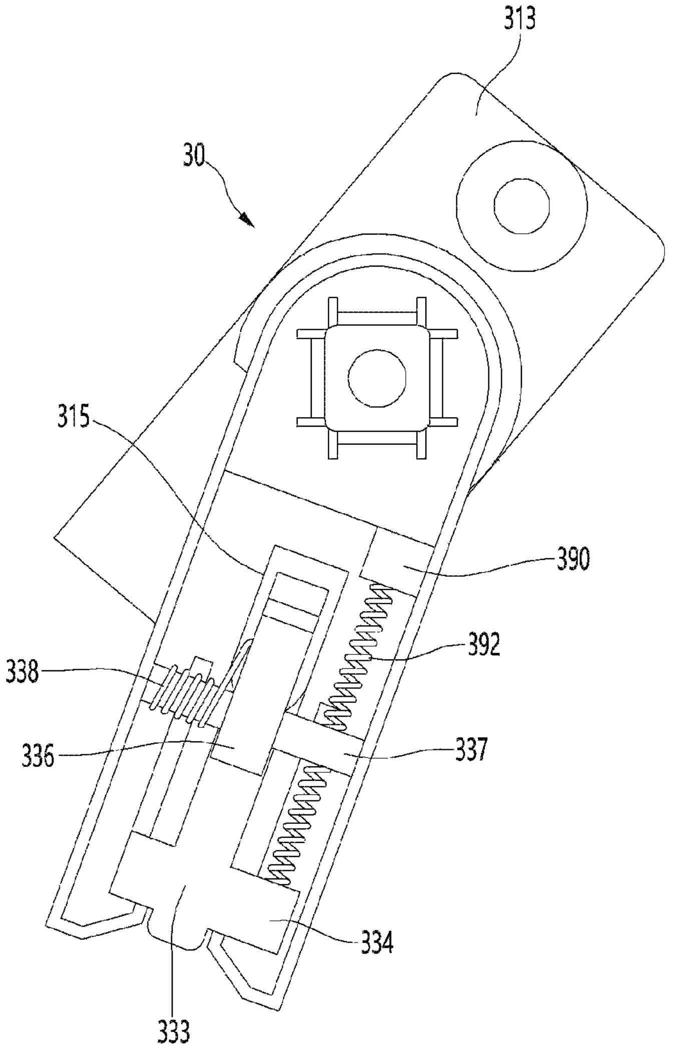
FIG. 8 is a bottom view of the auto closing device according to an embodiment.

FIG. 7 is an exploded perspective view of the auto closing device according to an embodiment, and FIG. 8 is a bottom view of the auto closing device according to an embodiment.

In FIG. 8, a state in which a first cover and a second cover are removed from the lever.

Referring to FIGS. 3 to 8, the auto closing device 30 according to this embodiment may include a body 310. The auto closing device 30 may further include a lever 320 rotatably coupled to the body 310. The auto closing device 30 may further include an elastic member 350 connected to the lever 320.

The body 310 may define an outer appearance of the auto closing device 30.

The lever 320 may rotate in the horizontal direction based on a rotational center line extending in the vertical direction. That is, the rotational center line of the first door 21 and the rotational center line of the lever 320 may be parallel to each other and spaced apart from each other in the horizontal direction.

The body 310 may include a first body 311. The body 310 may further include a second body 317 coupled to the first body 311.

The second body 317 may be coupled to the first body 311 at an upper side of the first body 311. The first body 311 may include an upper opening and a lower opening. A lower side of the second body 317 may be inserted through the upper opening of the first body 311.

One or more coupling extension portions 313 may be provided on the first body 311. A coupling hole 314 may be defined in the coupling extension portion 313. Although not limited, a plurality of coupling extension portions 313 may be disposed to extend horizontally from the first body 311. For example, in FIG. 7, a pair of coupling extension portions 313 extend in directions away from each other from the first body 311.

The coupling extension portion 313 may be disposed at a position spaced a predetermined distance upward from a lower end of the first body 311.

The auto closing device 30 may further include a connector 340 disposed in the body 310. A portion of the first connector 340 may protrude outward from the body 310. The first connector 340 may be connected to the lever 320.

The first connector 340 may be connected to the lever 320 to rotate together with the lever 320. The first connector 340 may be coupled to the lever 320 by passing through the lever 320 downward from an upper side of the lever 320 outside the body 310.

The first connector 340 may connect the elastic member 350 to the lever 320. The first connector 340 may include a lever coupling portion 341*a*. The first connector 340 may further include a first elastic member coupling portion 341*b*.

The lever coupling portion 341*a* may have a non-circular horizontal cross-section so as to be prevented from spinning while being coupled to the lever 320. For example, the lever coupling portion 341*a* may have a polygonal horizontal cross-section.

The lever 320 may include a coupling slot 322 to which the lever coupling portion 341*a* is coupled. The coupling slot 322 may be provided in a shape and size corresponding to those of the lever coupling portion 341*a*.

The first body 311 may include a lower opening. The lever coupling portion 341*a* passing through the lower opening may be accommodated in the coupling slot 322.

The first elastic member coupling portion 341*b* may include a first rib 346 and a second rib 347, which are spaced apart from each other in the horizontal direction. A coupling space 348 may be defined between the first rib 346 and the second rib 347. A portion of the elastic member 350 may be accommodated in the coupling space 348.

The lever 320 may include a first portion 321 coupled to the first connector 340. The coupling slot 322 may be provided in the first portion 321.

The lever 320 may further include a second portion 324 of which a portion is stepped with respect to the first portion 321. The second portion 324 may include a top surface and both side surfaces. A bottom surface of the second portion 324 may be opened. The bottom surface of the first portion 321 may also be opened.

The portion of the second portion 321, which is stepped with respect to the first portion 321, may be covered by a first cover 330. The other portion of the second portion 321 and the lower side of the first portion 321 may be covered by a second cover 331.

The second portion 324 may be in contact with the bracket body 520. A protruding pin 522 may be provided on the bracket body 520. The protruding pin 522 may protrude upward from the top surface of the bracket body 520. For example, the protruding pin 522 may be provided in a cylindrical shape.

The lever 320 may be in contact with the protruding pin 522 during opening and closing of the first door. A pin slot 325 in which the protruding pin 522 is accommodated to move may be defined in the lever 320. For example, the pin slot 325 may be defined in a central portion of the second portion 324.

The pin slot 325 may extend in the longitudinal direction of the lever 320. For example, the pin slot 325 may horizontally extend from an end of the second portion 324 toward the first portion 321. The protruding pin 522 may be drawn out of the pin slot 325 when the first door 21 is opened at a reference angle or more. The protruding pin 522 may be inserted into the pin slot 325 when the first door 21 is opened or closed at an angle less than the reference angle. Although not limited, the reference angle may be about 50 degrees or around about 50 degrees.

The auto closing device 30 may further include a sliding member for sliding block) 333 slidably connected to the lever 320. The sliding member 333 may be slid on the lever 320 in the horizontal direction. That is, the sliding member 333 may move in a direction crossing the rotational center line of the lever 320.

For example, the sliding member 333 may be slidably disposed in a space defined by the second portion 324.

The sliding member 333 may include a guide rib 335 for guiding the sliding of the sliding member 333. A rib slot 326 accommodating the guide rib 335 may be provided in the second portion 324.

The elastic member providing elastic force to the sliding member 333 may be provided in the lever 320. The elastic member may be, for example, a coil spring 392. In addition, a spring holder 390 supporting the coil spring 392 may be provided in the lever 320.

An extension portion 334 for supporting the coil spring 392 may be provided on the sliding member 333. For example, the sliding member 333 may move in a first direction (longitudinal direction). The extension portion 334 may extend from the sliding member 333 in a direction crossing the first direction. Thus, the coil spring 392 may be disposed at one side of the sliding member 333. As another example, a pair of coil springs 392 may be disposed at both sides of the sliding member 333 to elastically support the sliding member 333, respectively.

The coil spring 392 may provide elastic force to the sliding member 333 in a direction in which a portion of the sliding member 333 is exposed to the pin slot 325.

The direction in which the portion of the sliding member 333 is exposed to the pin slot 325 may be a direction in which the sliding member 333 moves away from the rotational center of the lever 320.

The sliding member 333 may move in forward and reverse directions. The direction in which the sliding member 333 moves away from the rotational center of the lever 320 may be referred to as a positive direction.

When no external force is applied to the sliding member 333, the sliding member 333 may be disposed in the pin slot 325 by the elastic force of the coil spring 392.

The auto closing device 30 may further include a locking member (or latch) 336 rotatably provided to the lever 320. For example, the locking member 336 may be disposed within the lever 320.

The locking member 336 may be coupled to the shaft 337. The locking member 336 may rotate while the shaft 337 is inserted into the shaft hole 328 of the second portion 324. The shaft 337 may extend, for example, in the horizontal direction. That is, the locking member 336 may rotate based on a rotational center line extending in the horizontal direction.

The shaft 337 may be coupled to the lever 320 at a position lower than the sliding member 333.

Thus, the locking member 336 may be rotatable together with the lever 320. The locking member 336 may rotate relative to the lever 320 with respect to the lever 320 based on the shaft 337.

The locking member 336 may be connected to the elastic member. The elastic member may be, for example, a torsion spring 338. One end of the torsion spring 338 may be connected to the locking member 336, and the other end of the torsion spring 338 may be supported on or in contact with the second portion 324. Of course, other types of springs other than the torsion spring 338 may provide the elastic force to the locking member 336.

An opening 327 through which the locking member 336 passes may be provided in the lever 320. For example, the opening 327 may be defined in a top surface of the second portion 324.

The locking member 336 may receive the elastic force of the torsion spring 338 in a direction in which the locking member 336 passes through the opening 327 to rotate upward in a state of being installed on the lever 320.

The locking member 336 may rotate by the sliding member 333 when the sliding member 333 moves in the reverse direction. When no external force acts on the locking member 336 (when the sliding member 333 moves in the forward direction to a stop position), a portion of the locking member 336 may pass through the opening 327 of the lever 320 and then be coupled to the body 310.

The body 310 may be provided with a locking groove 315 in which the locking member 336 protruding upward from the lever 320 is accommodated. For example, the locking groove 315 may be provided in a bottom surface of the coupling extension portion 313.

In a state in which the locking member 336 is inserted into the locking groove 315, the lever 320 may not rotate with respect to the body 310. On the other hand, when the locking member 336 gets out of the locking groove 315, the lever 320 may rotate with respect to the body 310.

Thus, in this embodiment, the state in which the locking member 336 is inserted into the locking groove 315 may be referred to as a locked state of the lever 320. The state in which the locking member 336 gets out of the locking groove 315 may be referred to as an unlocked state of the lever 320.

In addition, in this embodiment, the direction in which the locking member 336 rotates to be inserted into the locking groove 315 may be referred to as a locking direction, and the direction in which the locking member 336 rotates to be removed from the locking groove 315 may be referred to as an unlocking direction.

The elastic member 350 may be, for example, a torsion spring. The elastic member 350 may include a body portion 352 provided by winding a wire multiple times. The body portion 352 may have a cylindrical or truncated cone shape.

A vertical cross-section of a wire defining the body portion 352 may be non-circular. For example, a vertical cross-section of the wire may be a quadrangular shape.

The elastic member 350 may include a first extension portion 354 extending horizontally from a lower end of the body portion 352.

The first extension portion 354 may extend toward a center of the body portion 352. The first extension portion 354 may be coupled to the first connector 340. For example, the first extension portion 354 may be inserted into the coupling space 348 of the first elastic member coupling portion 341*b*.

When the first extension portion 354 is accommodated in the coupling space 348, the first elastic member coupling portion 341*b* may be accommodated into the body portion 352. That is, the body portion 352 may be coupled to the first elastic member coupling portion 341*b* while surrounding the first elastic member coupling portion 341*b*.

The elastic member 350 may further include a second extension portion 356 extending horizontally from an upper end of the body portion 352.

The auto closing device 30 may further include a second connector 360 coupled to the elastic member 350. The second extension portion 356 may be coupled to the second connector 360. The second connector 360 may be provided in a shape similar to the first connector 350.

The second connector 360 may include a second elastic member coupling portion 361*a*. The second connector 360 may include a pin coupling portion 361*b*. The second connector 360 may further include a partition plate 362 disposed between the second elastic member coupling portion 361*a* and the pin coupling portion 361*b*.

Based on the partition plate 362, the pin coupling portion 361*b* may be provided at an upper side of the partition plate 342. The second elastic member coupling portion 361*a* may be provided at the upper side of the partition plate 362.

The second elastic member coupling portion 361*a* may include a first rib 363 and a second rib 364, which are spaced apart from each other in the horizontal direction. A first coupling space 365 may be defined between the first rib 363 and the second rib 364.

The second extension portion 356 of the elastic member 350 may be inserted into the first coupling space 365.

When the second extension portion 356 is accommodated in the first coupling space 365, the second elastic member coupling portion 361*a* may be accommodated in the body portion 352. That is, the body portion 352 may be coupled to the second elastic member coupling portion 361*a* while surrounding the second elastic member coupling portion 361*a*.

The pin coupling portion 361*b* may include a third rib 366 and a fourth rib 367, which are spaced apart from each other in the horizontal direction. A second coupling space 368 may be defined between the third rib 366 and the fourth rib 367.

The auto closing device 30 may further include an upper cap 370 covering the upper opening of the body 310.

The upper cap 374 may include a cap body 372 having a hollow 373 therein, and a flange 374 extending from an upper end of the cap body 372 in the horizontal direction.

The cap body 372 may be inserted into the body 310. The flange 374 may be seated on a top surface of the body 310. The pin coupling portion 361*b* may be inserted into the hollow 373.

The auto closing device 30 may further include a fixing pin 380 for fixing the upper cap 374 to the body 310.

A plurality of first pin holes 318 through which the fixing pins 380 pass may be defined in the body 310. The cap body 372 may include a plurality of second pin holes 375 through which the fixing pin 380 passes.

The fixing pin 380 may be inserted into the second coupling space 368. That is, after passing through one first pin hole 318 and one second pin hole 375, the fixing pin 380 may pass through the second coupling space 368 and pass through the other second pin hole 375 and the other first pin hole 318.

The positions of the upper cap 370 and the second connector 360 are fixed to the body 310 by the fixing pin 380. That is, rotation of the upper cap 370 and the second connector 360 may be restricted by the fixing pin 380.

That is, in this embodiment, the second extension portion 356 of the elastic member 350 is a fixed end, and the first extension portion 354 is a movable end. Thus, in a state in which the second extension portion 356 is fixed, the first extension portion 354 is rotatable together with the lever 320.

When the first extension portion 354 of the elastic member 350 rotates in one direction while the second extension portion 356 is fixed, the elastic member 350 accumulates the elastic force. The elastic force accumulated by the elastic member 350 may act as the lever 320 so that the lever 320 rotates in another direction opposite to the one direction.

In this manner, the elastic force accumulated by the elastic member 350 substantially acts on the first door 21 in the process of closing the first door 21 so that the first door 21 is automatically closed at a predetermined position.

A structure for fixing the second extension portion 356 of the elastic member 350 described above is merely an example, and various fixing structures such as a structure in which the second extension portion 356 is directly fixed to the body 310 or the upper cap 370 may be applied.

Figure 9:
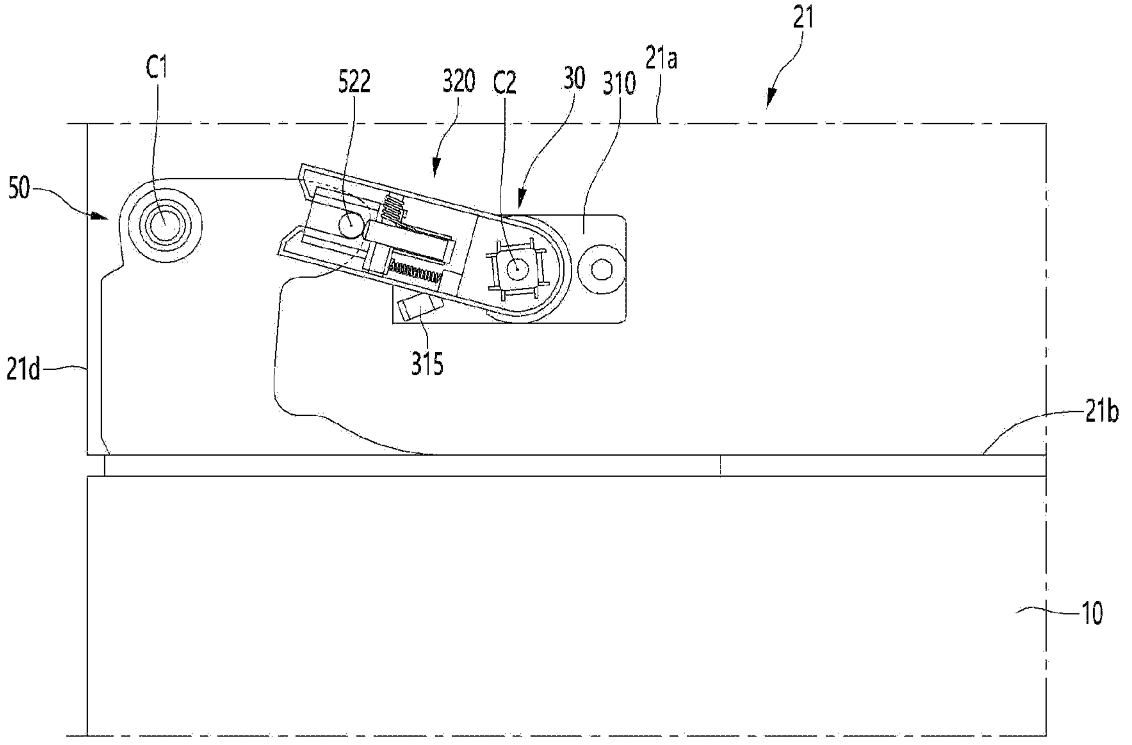
FIG. 9 is a view illustrating a position of a lever of the auto closing device in a state in which a first door is closed.

FIG. 9 is a view illustrating a position of the lever of the auto closing device in the state in which a first door is closed. FIG. 9 is a view illustrating a position of the lever of the auto closing device in a state in which a first door is closed. In FIG. 9, a state in which a first cover and a second cover are removed from the lever.

Referring to FIG. 9, when the refrigerator according to this embodiment is installed in a furniture cabinet, it is preferable that a thickness of the first door 21 is reduced to reduce the forward protruding of the first door 21 from the front surface of the furniture cabinet.

When the thickness of the first door 21 is reduced, in order for the auto closing device 30 to be installed in the first door 21, the auto closing device 30 may be installed at a position spaced apart from the rotational center line C1 of the first door 21.

For example, when the first door 21 is closed, the rotational center line C1 of the first door 21 and the rotational center line C2 of the lever 320 are spaced apart from each other.

When the refrigerator is installed in the furniture cabinet, an opening angle needs to be secured while the first door 21 does not collide with the furniture cabinet during the rotation of the first door 21. Therefore, in this embodiment, the rotational center line C1 of the first door 21 may be disposed close to the front and side surfaces of the first door 21.

For example, in the state in which the first door 21 is closed, the rotational center line C1 of the first door 21 may be disposed closer to a front surface 21*a* than a rear surface 21*b* of the first door 21.

A distance between the rotational center line C1 of the first door 21 and the rear surface 21*b* of the first door 21 may be more than twice a distance between the rotational center line C1 of the first door 21 and the front surfaces 21*a* of the first door 21.

In the state in which the first door 21 is closed, the rotational center line C1 of the first door 21 may be disposed closer to a first side surface 21*d* of both surfaces of the first door 21.

In the state in which the first door 21 is closed, a distance between the rotational center line C1 of the first door 21 and the first side surface 21*d* may be less than that between the rotational center line C1 of the first door 21 and the rear surface 21*b* of the first door 21.

In the state in which the first door 21 is closed, the rotational center line C1 of the first door 21 may be disposed closer to the front surface 21*a* of the first door 21 than the rotational center line C2 of the lever 320.

When the first door 21 is closed, the rotational center line C1 of the first door 21 may be disposed away from the rear surface 21*b* of the first door 21 than the rotational center line C2 of the leer 320.

The body 310 may be disposed closer to the front surface 21*a* of the first door 21 than to the rear surface 21*b* of the first door 21.

When the first door 21 is closed, the protruding pin 522 may be disposed closer to the front surface 21*a* of the first door 21 than to the center line C2 of rotation of the lever 320.

Figure 10:
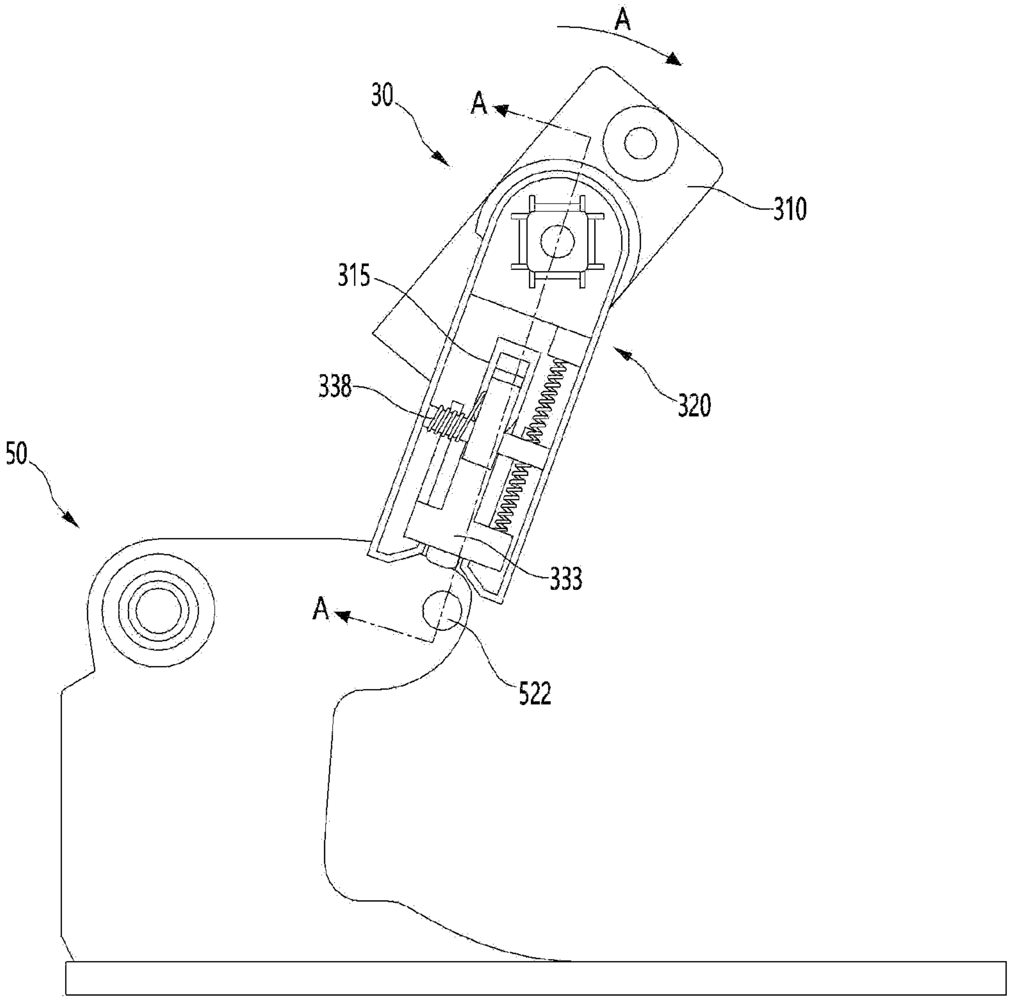
FIG. 10 is a view illustrating relative positions of the hinge bracket and the lever in a state in which a first door is opened at an angle greater than the reference angle.
Figure 11:
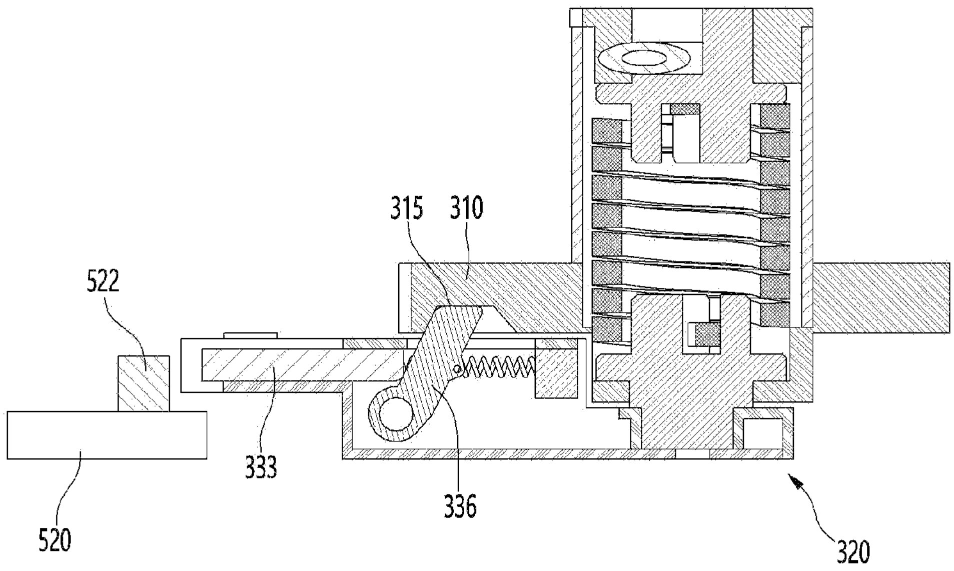
FIG. 11 is a cross-sectional view taken along line A-A of FIG. 10.
Figure 12:
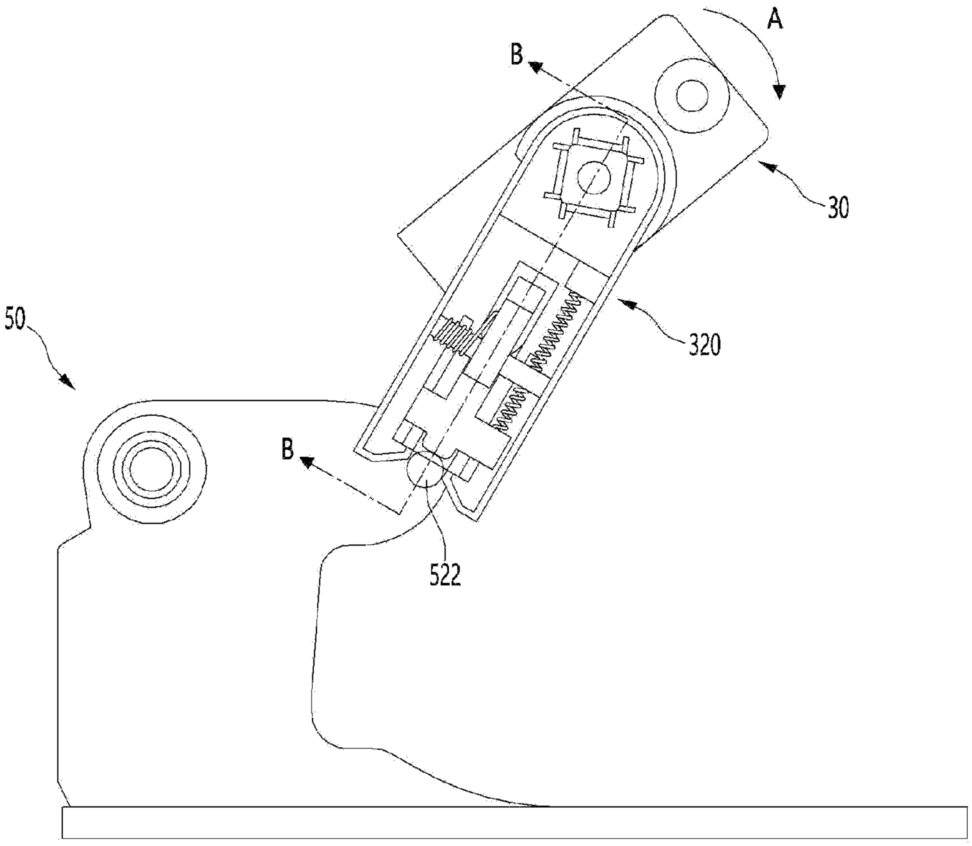
FIG. 12 is a view illustrating relative positions of the hinge bracket and the lever in a state in which the first door rotates at a second angle less than the reference angle.
Figure 13:
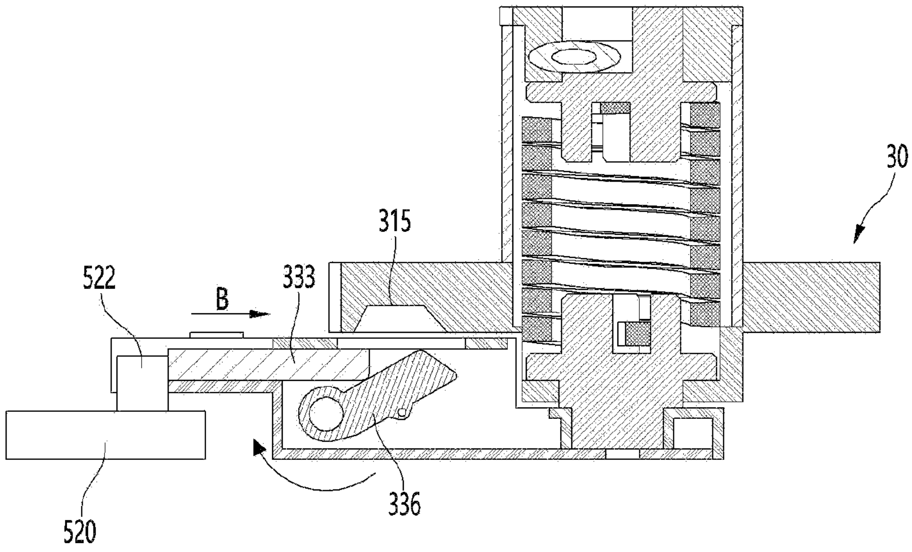
FIG. 13 is a sectional view taken along line B-B of FIG. 12.

FIG. 10 is a view illustrating relative positions of the hinge bracket and the lever in a state in which a first door is opened at an angle greater than the reference angle, and FIG. 11 is a cross-sectional view taken along line A-A of FIG. 10. FIG. 12 is a view illustrating relative positions of the hinge bracket and the lever in a state in which the first door rotates at a second angle less than the reference angle, and FIG. 13 is a sectional view taken along line B-B of FIG. 12.

Figure 14:
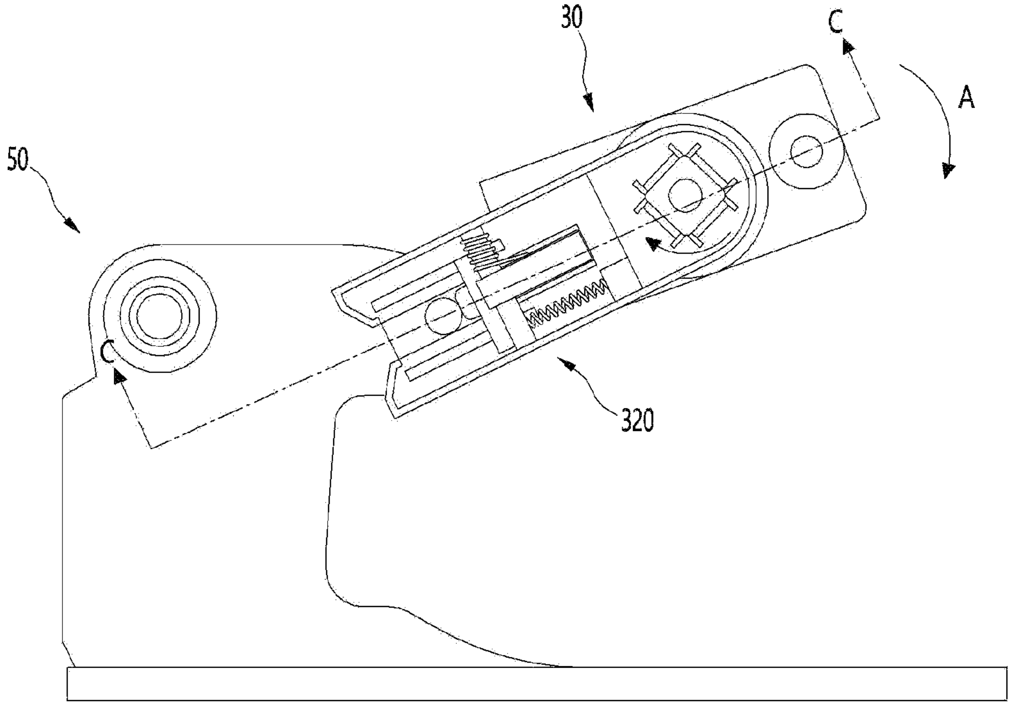
FIG. 14 is a view illustrating relative positions of the hinge bracket and the lever in a state in which a first door rotates at a first angle less than the second angle.
Figure 15:
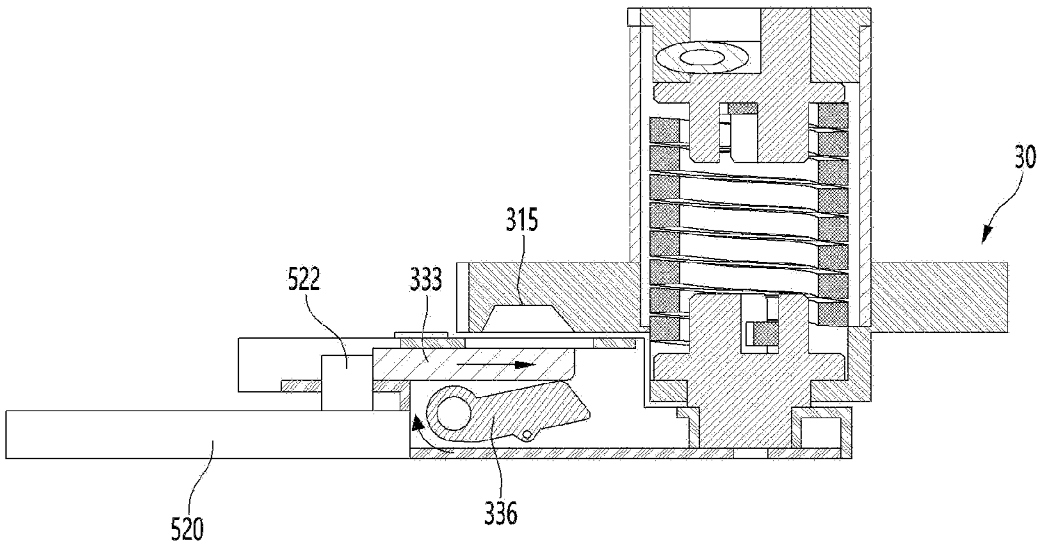
FIG. 15 is a cutaway cross-sectional view taken along line C-C of FIG. 14.

FIG. 14 is a view illustrating relative positions of the hinge bracket and the lever in a state in which a first door rotates at a first angle less than the second angle, and FIG. 15 is a cutaway cross-sectional view taken along line C-C of FIG. 14.

Figure 16:
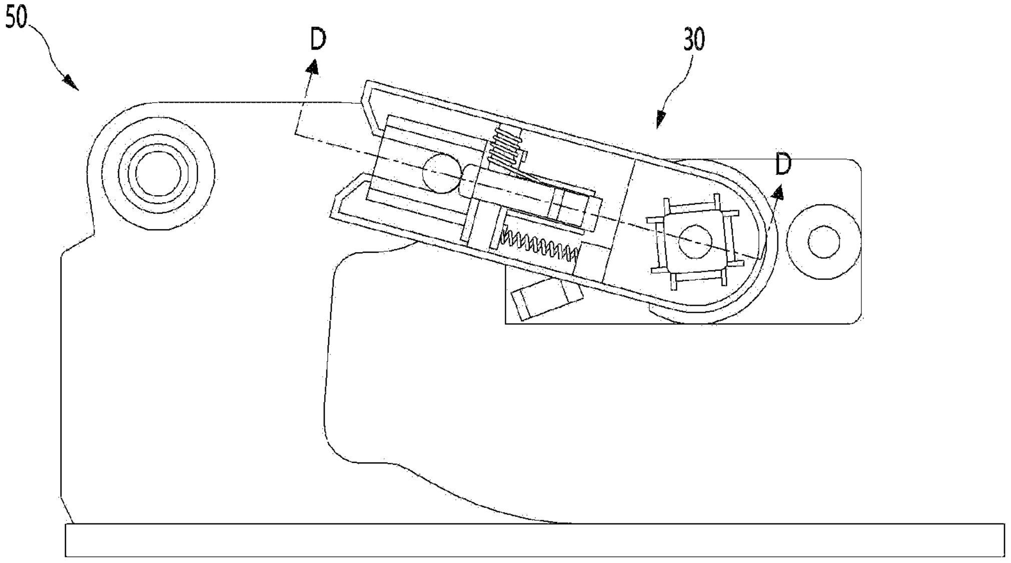
FIG. 16 is a view illustrating relative positions of the hinge bracket and the lever in the state in which the first door is closed.
Figure 17:
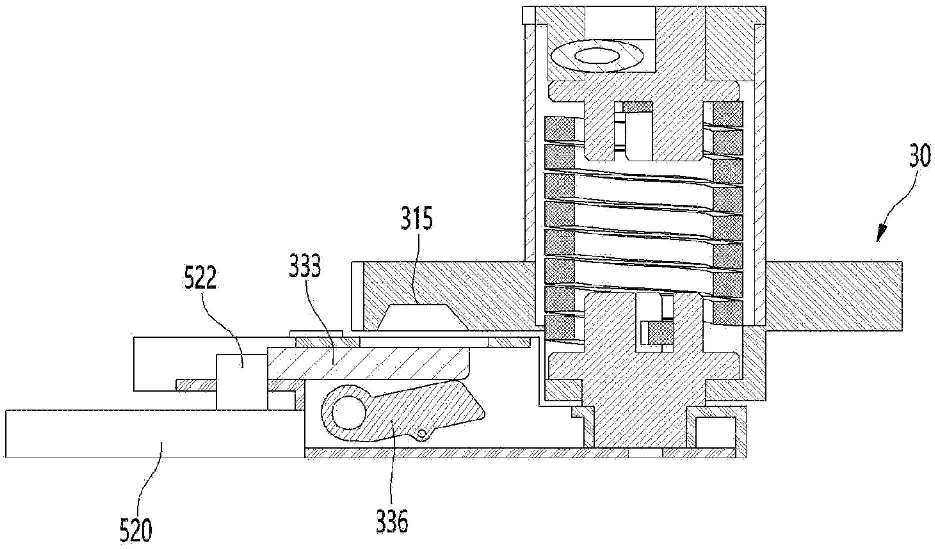
FIG. 17 is a cutaway cross-sectional view taken along line D-D of FIG. 16.

FIG. 16 is a view illustrating relative positions of the hinge bracket and the lever in the state in which the first door is closed, and FIG. 17 is a cutaway cross-sectional view taken along line D-D of FIG. 16.

FIGS. 10, 12, 14, and 16 illustrate a state in which the first cover and the second cover are removed from the lever.

Referring to FIGS. 7 to 17, in a state in which the first door 21 is opened at an angle greater than the reference angle, other force other than the elastic force of the coil spring 392 does not act on the sliding member 333.

In this case, as illustrated in FIG. 10, the sliding member 333 may be maintained to move to a standby position and maintained. In a state in which the sliding member 333 moves to the standby position, the locking member 336 may be inserted into the locking groove 315 of the body 310 by the elastic force of the torsion spring 338.

Thus, the lever 320 is in the locked state, and the rotation of the lever 320 relative to the body 310 may be restricted.

Here, in the locked state of the lever 320, the elastic member 350 may accumulate first elastic force having a predetermined intensity. The fact that the elastic member 350 accumulates the first elastic force means that, when the lever 320 is in the unlocked state, the lever 320 may be rotatable in a clockwise direction on the drawing with respect to the rotational center line C2 due to the first elastic force of the elastic member 350.

Next, in the process of closing the first door 21 in a direction A, when the angle between the first door 21 and the front surface 10*a* of the cabinet 10 is less than the reference angle, the protruding pin 522 may be inserted into the pin slot 325 and then be in contact with the sliding member 333.

In this state, when the first door 21 may additionally rotate in the direction A, the protruding pin 522 may press the sliding member 333 while moving in the pin slot 325. Then, the sliding member 333 slides in the reverse direction within the lever 320 (direction of an arrow B). When the sliding member 333 is slid in the reverse direction, the sliding member 333 may press the locking member 336 to allow the locking member 336 to move in an unlocking direction.

When a movement distance of the sliding member 333 in the reverse direction increases, a rotation angle of the locking member 336 in the unlocking direction may increase. When the locking member 336 continuously rotates in the unlocking direction, the locking member 336 may be removed from the locking groove 315.

For example, as illustrated in FIG. 12, in a state in which the first door 21 is closed at an angle less than or equal to a second angle less than the reference angle, the locking member 336 may get out of the locking groove 315. Although not limited, the second angle may be about 40 degrees.

As illustrated in FIG. 13, when the locking member 336 gets out of the locking groove 315, the lever 320 is rotatable with respect to the body 310.

In this state, the lever 320 may rotate in the clockwise direction with respect to the body 310 based on FIG. 12 by the elastic force of the elastic member 350. The elastic force of the elastic member 350 may decrease as the rotation angle of the lever 320 in the clockwise direction increases. Thus, the reduced elastic force of the elastic member 350 may act as the closing force of the first door 21.

As illustrated in FIG. 13, when the locking member 336 gets out of the locking groove 315, even if the user does not provide the rotational force to the first door 21 to close the first door 21, the first door 21 may be automatically closed by the elastic force of the elastic member 350.

As illustrated in FIG. 14, even when the first door 21 is opened by the first angle less than the second angle, the lever 320 may be remained in the rotatable state, and the elastic force of the elastic member 350 may be applied to the lever 320.

In the process of automatically closing the first door 21, since the protruding pin 522 presses the sliding member 333 so that the sliding member 333 moves in an opposite direction, the locking member 336 may be prevented from protruding to the upper side of the lever 320.

As illustrated in FIG. 16, when the first door 21 is completely closed, the lever 320 may substantially rotates at a predetermined angle with respect to the body 310, and thus, the elastic member 350 may be maintained to accumulate the second elastic force having a predetermined intensity. Here, the second elastic force may be less than the first elastic force.

Therefore, since the elastic member 350 applies force in the direction in which the first door 21 is closed in the state in which the first door 21 is closed, the closed state of the first door 21 may be stably maintained.

According to this embodiment, in a state in which the first door 21 is opened at an angle greater than the reference angle, the lever 320 may be in the locked state in a state in which the elastic member 350 accumulates the first elastic force.

In this state, to close the first door 21, when the user rotates the first door 21 from the reference angle by a difference between the reference angle and the second angle, the locking of the lever 320 may be released. The difference between the reference angle and the second angle is not limited, but may be about 10 degrees or less.

Therefore, if the user rotates the first door 21 only at an angle of about 10 degrees or less from the reference angle, the user may not have to additionally apply force for closing the first door 21 to the first door 21, the user may close the first door with little force.

In the state in which the locking of the lever 320 is released, the first door 21 may be automatically closed by the elastic force of the elastic member 350 even if the user does not manually close the first door 21. Thus, when the user releases the first door 21 in the process of closing the first door 21, the first door 21 may be prevented from being maintained in the opened state.

In this embodiment, since the rotation angle of the lever 320 with respect to the body 310 is set differently compared to the rotation angle of the first door 21, when the first door 21 is opened to rotate, an interaction between the protruding pin 522 and the sliding member 333 may be possible.

For example, the lever 320 may be set so as not to rotate when the first door 21 rotates from an angle greater than the reference angle to a certain angle range in the closing direction.

When the first door 21 rotates from the second angle to the first angle, the rotation angle of the lever 320 with respect to the body 310 may be set to be less than the difference between the second angle and the first angle.

When the first door 21 rotates from the first angle to the completely closed position, the rotation angle of the lever 320 with respect to the body 310 may be set to be greater than the first angle.

A case in which the first door 21 is opened will be briefly described.

When the first door 21 is opened while the first door 21 is closed, the lever 320 may rotate in a counterclockwise direction with respect to the first body 310. When the lever 320 rotates in the counterclockwise direction with respect to the first body 310, the elastic force of the elastic member 350 may increase from the second elastic force.

When the opening angle of the first door 21 increases, the rotational angle of the lever 320 increases, and the elastic force of the elastic member 350 may continuously increase.

In the process of increasing in opening angle of the first door 21, the lever 320 may rotate so that the protruding pin 522 gets out of the pin slot 325, and in this process, the sliding member 333 may be slid in the forward direction.

When the first door 21 rotates beyond the reference angle, the pressing force applied to the locking member 336 from the sliding member 333 is removed, and the locking member 336 may rotate in the locking direction.

When the locking member 336 rotates in the locking direction, the locking member 336 may pass through the opening 327 of the lever 320 and be accommodated in the locking groove 315 of the body 310. As a result, the lever 320 may be in the locked state. Then, the first door 21 may be additionally opened in a state in which the elastic member 350 has the accumulated elastic force.

Figure 18:
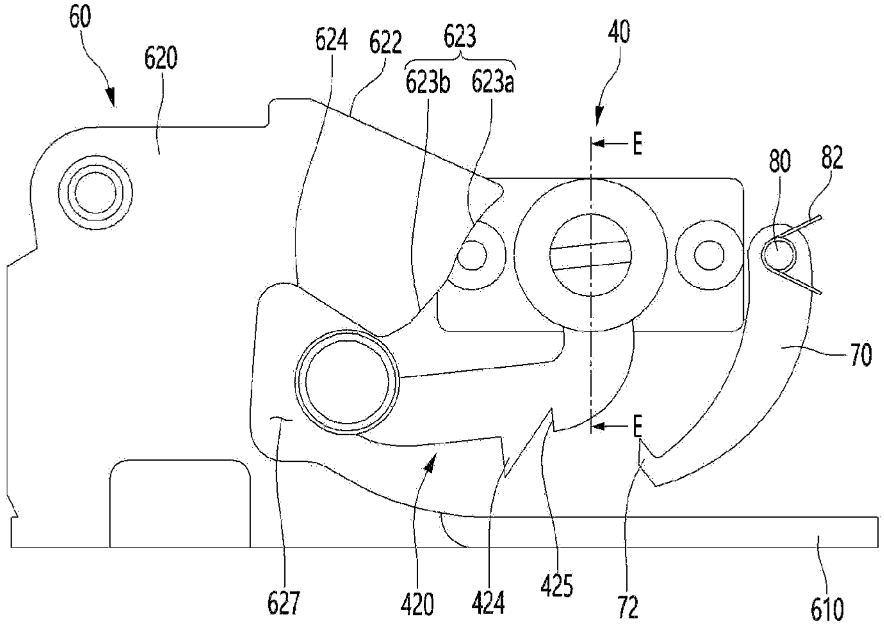
FIG. 18 is a view illustrating an auto closing device, a locking member, and a hinge bracket in a state in which a first door is closed according to another embodiment.
Figure 19:
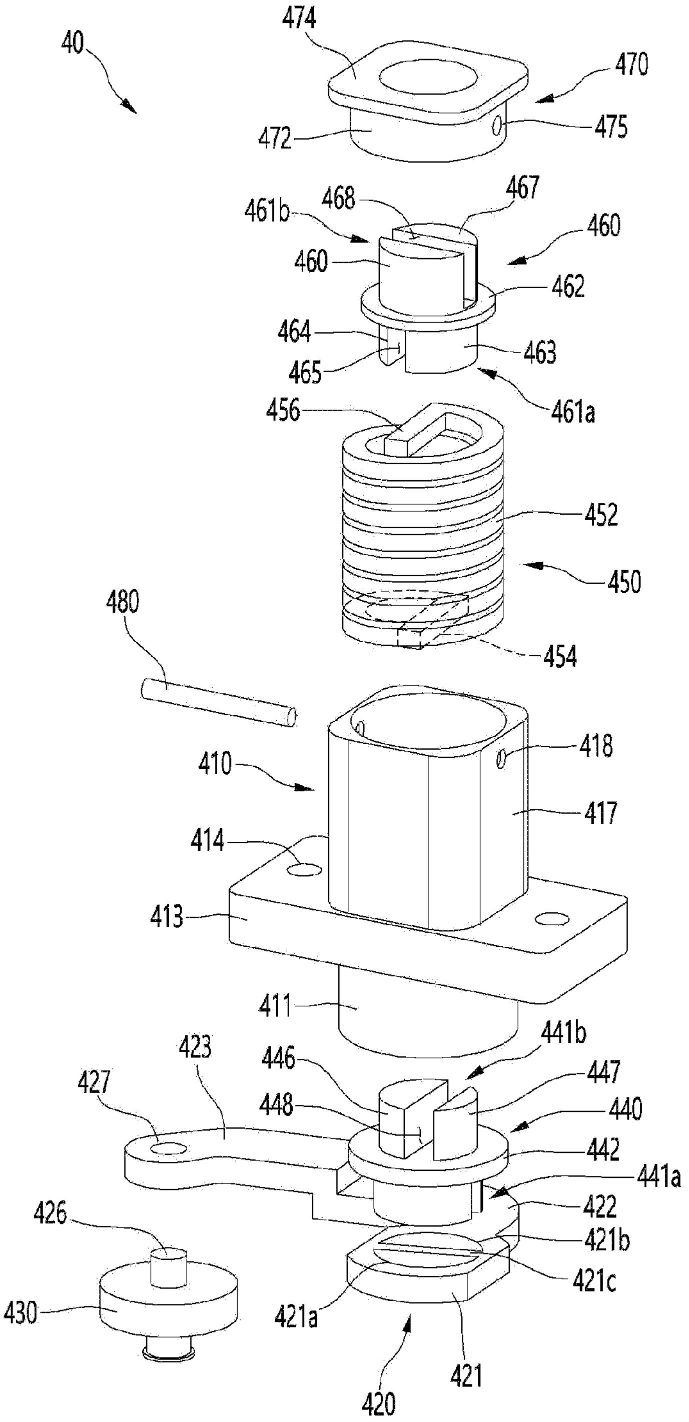
FIG. 19 is an exploded perspective view of the auto closing device according to another embodiment.
Figure 20:
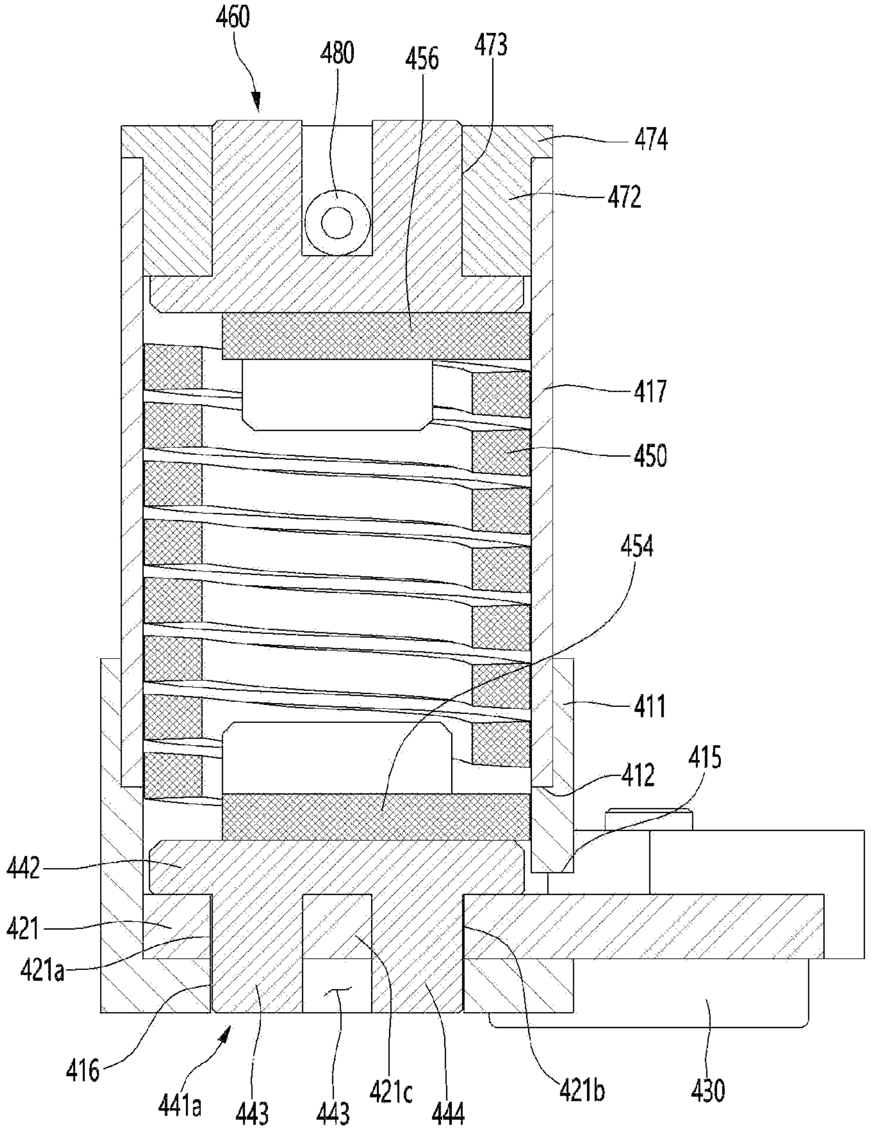
FIG. 20 is a cutaway cross-sectional view taken along line E-E of FIG. 19.

FIG. 18 is a view illustrating an auto closing device, a locking member, and a hinge bracket in a state in which a first door is closed according to another embodiment, FIG. 19 is an exploded perspective view of the auto closing device according to another embodiment, and FIG. 20 is a cutaway cross-sectional view taken along line E-E of FIG. 19.

This embodiment is the same as the previous embodiment in others, but there are differences in position of the locking member and shape of the lever. Hereinafter, characterized portions according to the current embodiment will be principally described.

In FIG. 18, the door is omitted, and a position at which the auto closing device is coupled to the door may be the same as or similar to that of FIG. 9.

Referring to FIGS. 18 to 20, an auto closing device 40 according to this embodiment may include a body 410. The auto closing device 40 may further include a lever 420 rotatably coupled to the body 410. The auto closing device 40 may further include an elastic member 450 connected to the lever 420.

In this embodiment, a locking member 70 may be disposed outside the auto closing device 40.

The body 410 may accommodate a portion of the lever 420. In a state in which a portion of the lever 420 is accommodated in the body 410, the lever 420 may rotate. For example, the lever 420 may rotate in the horizontal direction based on a rotational center line extending in the vertical direction. That is, the rotational center line of the first door 21 and the rotational center line of the lever 420 may be parallel to each other and spaced apart from each other in the horizontal direction.

The body 410 may include a slot 415 into which a portion of the lever 420 is inserted. The lever 420 may pass through the slot 415 in a lateral direction of the body 410 and be inserted into the body 410.

The slot 415 may extend to be elongated in a circumferential direction (or in a circumferential direction) so that the lever 420 rotates in a state of passing through the slot 415.

The body 410 may include a first body 411. The body 410 may further include a second body 417 coupled to the first body 411. The second body 417 may be coupled to the first body 411 at an upper side of the first body 411. The first body 411 may include an upper opening and a lower opening. A lower side of the second body 417 may be inserted through the upper opening of the first body 411. The first body 411 may include a seating groove 412 in which the second body 417 is seated. The slot 415 may be defined in the first body 411.

One or more coupling extension portions 413 may be provided on the first body 411. A coupling hole 414 may be defined in the coupling extension portion 413. Although not limited, a plurality of coupling extension portions 413 may be disposed to extend horizontally from the first body 411.

The auto closing device 40 may further include a first connector 440 connected to the lever 420 within the body 410.

The first connector 440 may be connected to the lever 420 to rotate together with the lever 420. The first connector 440 may be coupled to the lever 420 by passing through the lever 420 downward from the upper side of the lever 420 inserted into the body 410.

The first connector 440 may connect the elastic member 450 to the lever 420. The first connector 440 may include a lever coupling portion 441*a*. The first connector 440 may further include a first elastic member coupling portion 441*b*.

The first connector 440 may further include a partition plate 442 disposed between the lever coupling portion 441*a* and the first elastic member coupling portion 441*b*. Based on the partition plate 442, the lever coupling portion 441*a* may be provided below the partition plate 442. The first elastic member coupling portion 441*b* may be provided above the partition plate 442.

The lever coupling portion 441*a* may include a first rib 443 and a second rib 444, which are spaced apart from each other in a horizontal direction. A first coupling space 445 may be defined between the first rib 443 and the second rib 444.

The lever 420 may include a first rib hole 421*a* through which the first rib 443 passes. The lever 420 may further include a second rib hole 421*b* through which the second rib 444 passes. The first rib hole 421*a* may be provided in a shape and size corresponding to those of the first rib 443. The second rib hole 421*b* may be provided in a shape and size corresponding to those of the second rib 444.

Since the first rib hole 421*a* and the second rib hole 421*b* are spaced apart from each other, a coupling rib 421*c* may exist between the first rib hole 421*a* and the second rib hole 421*b*.

When the first rib 443 passes through the first rib hole 421*a*, and the second rib 444 passes through the second rib hole 421*b*, the coupling rib 412*c* may be accommodated in the first coupling space 445, and thus, the lever coupling portion 441*a* and the lever 420 are completely coupled to each other.

The first body 411 may include a lower opening 416. The lever coupling portion 441*a* passing through the lever 420 may be accommodated in the lower opening 416.

The first elastic member coupling portion 441*b* may include a third rib 446 and a fourth rib 447, which are spaced apart from each other in a horizontal direction. A second coupling space 448 may be defined between the third rib 446 and the fourth rib 447.

A portion of the elastic member 450 may be accommodated in the second coupling space 448.

The lever 410 may include a first portion 421 coupled to the first connector 440. The first portion 421 may also be referred to as a connector coupling portion.

The first portion 421 may pass through the slot 415 and be inserted into the body 410.

The lever 420 may further include a second portion 422 extending by a predetermined length in a horizontal direction from the first portion 421. The second portion 422 may extend while maintaining the same height as the first portion 421. The second portion 422 is a portion extending outward from the body 410. The lever 420 may further include a third portion 423 that is stepped with respect to the second portion 422.

The third portion 423 may be in contact with a bracket body 620 of a hinge bracket 60. Alternatively, the lever 420 may include a roller 430 that is coupled to the third portion 423 and is in contact with the bracket body 620.

In this specification, a portion of the lever 420, which is in contact with the bracket body 420, may be referred to as a contact portion. In this case, the third portion 423 may be a contact portion, or the roller 430 may be a contact portion. FIG. 19 illustrates an example in which the roller 430 is provided on the third portion 423. The roller 430 may be rotatably coupled to the third portion 423.

In this embodiment, the third portion 423 may be disposed higher than each of the first and second portions 421 and 422. Therefore, to prevent the roller 430 from interfering with the second door 22, the roller 430 may be rotatably connected to a lower side of the third portion 423.

The roller 430 may be coupled to the third portion 423 by a pin 436. A pin coupling hole 427 to which the pin 436 is coupled may be defined in the third portion 423.

The elastic member 450 may be, for example, a torsion spring. The elastic member 450 may include a body portion 452 provided by winding a wire multiple times. The body portion 452 may have a cylindrical or truncated cone shape.

A vertical cross-section of a wire defining the body portion 452 may be non-circular. For example, a vertical cross-section of the wire may be a quadrangular shape.

The elastic member 450 may include a first extension portion 454 extending horizontally from a lower end of the body portion 452. The first extension portion 454 may extend toward a center of the body portion 452. The first extension portion 454 may be coupled to the first connector 440. For example, the first extension portion 454 may be inserted into the second coupling space 448 of the first elastic member coupling portion 441*b*.

In addition, when the first extension portion 454 is accommodated in the second coupling space 448, the first elastic member coupling portion 441*b* may be accommodated inside the body portion 452.

In the state in which the first extension portion 454 is accommodated in the second coupling space 448, the first extension portion 454 and the body 452 may be seated on the partition plate 442.

The elastic member 450 may further include a second extension portion 456 extending horizontally from an upper end of the body portion 452.

The auto closing device 40 may further include a second connector 460 coupled to the elastic member 450. The second extension portion 456 may be coupled to the second connector 460.

The second connector 460 may include a second elastic member coupling portion 461*a*. The second connector 460 may further include a pin coupling portion 461*b*. The second connector 460 may further include a partition plate 462 disposed between the second elastic member coupling portion 461*a* and the pin coupling portion 461*b*.

Based on the partition plate 462, the pin coupling portion 461*b* may be provided above the partition plate 442. The second elastic member coupling portion 461*a* may be provided above the partition plate 462.

The second elastic member coupling portion 461*a* may include a first rib 463 and a second rib 464, which are spaced apart from each other in the horizontal direction. A first coupling space 465 may be defined between the first rib 463 and the second rib 464. The second extension portion 456 of the elastic member 450 may be inserted into the first coupling space 465.

In addition, when the second extension portion 454 is accommodated in the first coupling space 465, the second elastic member coupling portion 461*a* may be accommodated in the body portion 452.

The pin coupling portion 461*b* may include a third rib 466 and a fourth rib 467, which are spaced apart from each other in the horizontal direction. A second coupling space 468 may be defined between the third rib 466 and the fourth rib 467.

The auto closing device 40 may further include an upper cap 470 covering the upper opening of the body 410. The upper cap 470 may include a cap body 472 having a hollow 473 therein, and a flange 474 extending from an upper end of the cap body 472 in the horizontal direction.

The cap body 472 may be inserted into the body 410. The flange 474 may be seated on a top surface of the body 410. The pin coupling portion 461*b* may be inserted into the hollow 473.

The auto closing device 40 may further include a fixing pin 480 for fixing the upper cap 474 to the body 410.

A plurality of first pin holes 418 through which the fixing pins 480 pass may be defined in the body 410. The cap body 472 may include a plurality of second pin holes 475 through which the fixing pin 480 passes. The fixing pin 480 may be inserted into the second coupling space 468. That is, after passing through one first pin hole 418 and one second pin hole 475, the fixing pin 480 may pass through the second coupling space 468 and pass through the other second pin hole 475 and the other first pin hole 418.

The positions of the upper cap 470 and the second connector 460 are fixed to the body 410 by the fixing pin 480. That is, rotation of the upper cap 470 and the second connector 460 may be restricted by the fixing pin 480.

That is, in this embodiment, the second extension portion 456 of the elastic member 450 is a fixed end, and the first extension portion 454 is a movable end. Thus, in a state in which the second extension portion 456 is fixed, the first extension portion 454 is rotatable together with the lever 420.

When the first extension portion 454 of the elastic member 450 rotates in one direction while the second extension portion 456 is fixed, the elastic member 450 accumulates the elastic force. The elastic force accumulated by the elastic member 450 may act as the lever 420 so that the lever 420 rotates in another direction opposite to the one direction.

In this manner, the elastic force accumulated by the elastic member 450 substantially acts on the first door 21 in the process of closing the first door 21 so that the first door 21 is automatically closed at a predetermined position.

The locking member 70 may be rotatably connected to the first door 21 at one side of the body 410. For example, the locking member 70 may be rotatably connected to the first door 21 by a shaft 80 extending in a vertical direction. Here, the locking member 70 may receive elastic force from an elastic member 82.

The elastic member 82 may be, for example, a torsion spring. One end of the elastic member 82 may be in contact with the locking member 70, and the other end of the elastic member 82 may be in contact with the first door 21 or the body 410. The elastic member 82 may rotate in the horizontal direction by the shaft 80.

A hook 72 may be provided on an end of the locking member 70. The lever 420 may include a locking groove 425 into which the hook 72 is inserted. The lever 420 may further include a protrusion 424 through which the hook 72 getting out of the locking groove 425 is slid.

The locking member 70 may perform the same function as the locking member 336 mentioned in the previous embodiment. Thus, the rotation of the lever 420 may be restricted in a state in which the locking member 70 is accommodated in the locking groove 425.

The hinge bracket 60 may include a coupling portion 610 to be coupled to the cabinet 10. The hinge bracket 60 may include a bracket body 620 extending in the horizontal direction from the coupling portion 610.

The bracket body 620 may include a contact surface that is in contact with the lever 420.

For example, the roller 430 of the lever 420 may be in contact with the contact surface. While the lever 420 moves along the contact surface, the lever 420 may rotate.

The contact surface may include a first surface 622 on which the lever 420 is in initially contact with the contact surface in the process of closing the first door 21. When the first door 21 is opened at a predetermined angle or more, the lever 420 may not be in contact with the first surface 622. In a process of closing the first door 21, the lever 420 may be in contact with the first surface 622.

The contact surface may further include a second surface 623 extending from the first surface 622. The second surface 623 may be inclined with respect to the first surface 622.

As the second surface 623 approaches the front surface 10*a* of the cabinet 10, the second surface 623 may pass through a rotational center line of the first door 21 and then be inclined in a direction closer to a virtual line perpendicular to the front surface 10*a* of the cabinet.

The contact surface may further include a third surface 624 extending from the second surface 623. The third surface 624 may be inclined with respect to the second surface 623.

The third surface 624 may be inclined not only with respect to the front surface 10*a* of the cabinet 10, but also with respect to the virtual line. The third surface 624 extends in a direction closer to the virtual line as a distance from the front surface 10*a* of the cabinet 10 increases.

The bracket body 610 may define an accommodation groove 627 in which the roller 430 is accommodated in a state in which the roller 430 is in contact with the third surface 624. That is, the roller 430 may be disposed in the accommodation groove 627 in the state in which the door is closed.

The second surface 623 may include a concave surface 623*a* and a convex surface 623*b*. The concave surface 623*a* may be a surface connected to the first surface 622. The convex surface 623*b* may be a surface connected to the third surface 624. The roller 430 may be in sequentially contact with the first surface 622, the concave surface 623*a* and the convex surface 623*b* and then be in contact with the third surface 624.

Figure 21:
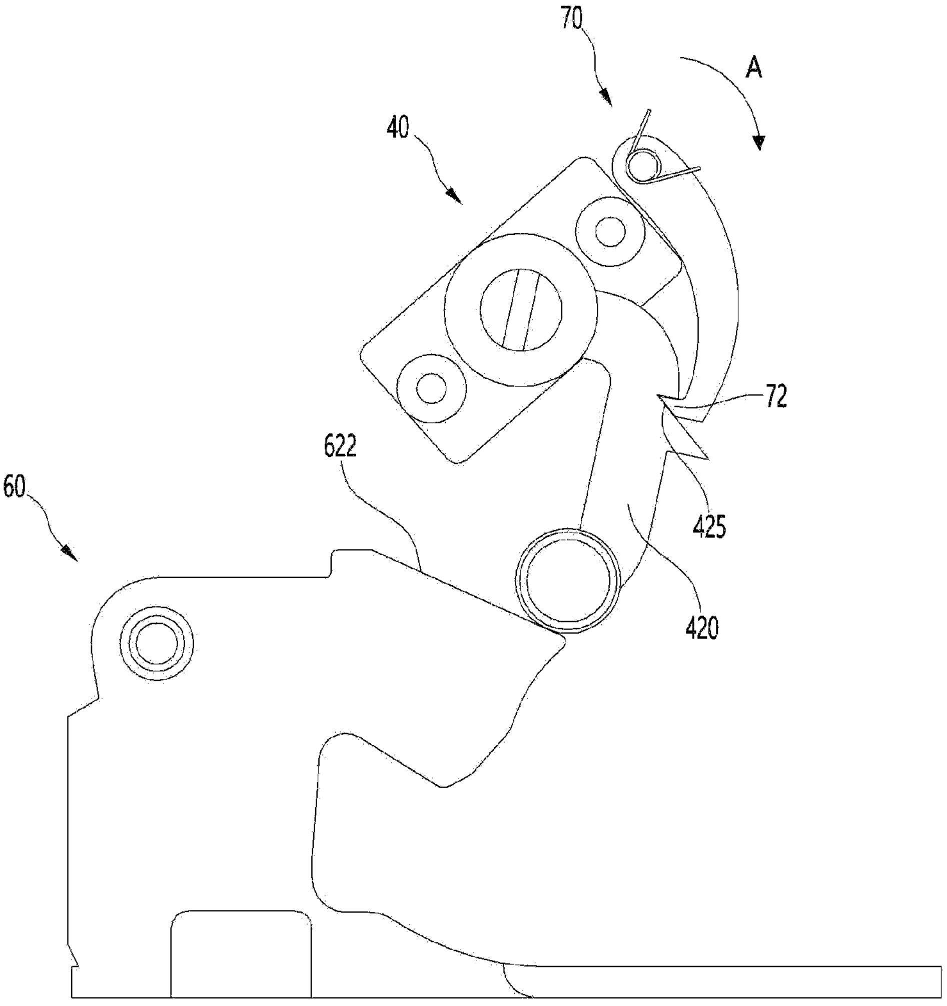
FIG. 21 is a view illustrating relative positions of the hinge bracket, a lever, and the locking member in a state in which the first door rotates at an angle greater than the reference angle according to another embodiment.
Figure 22:
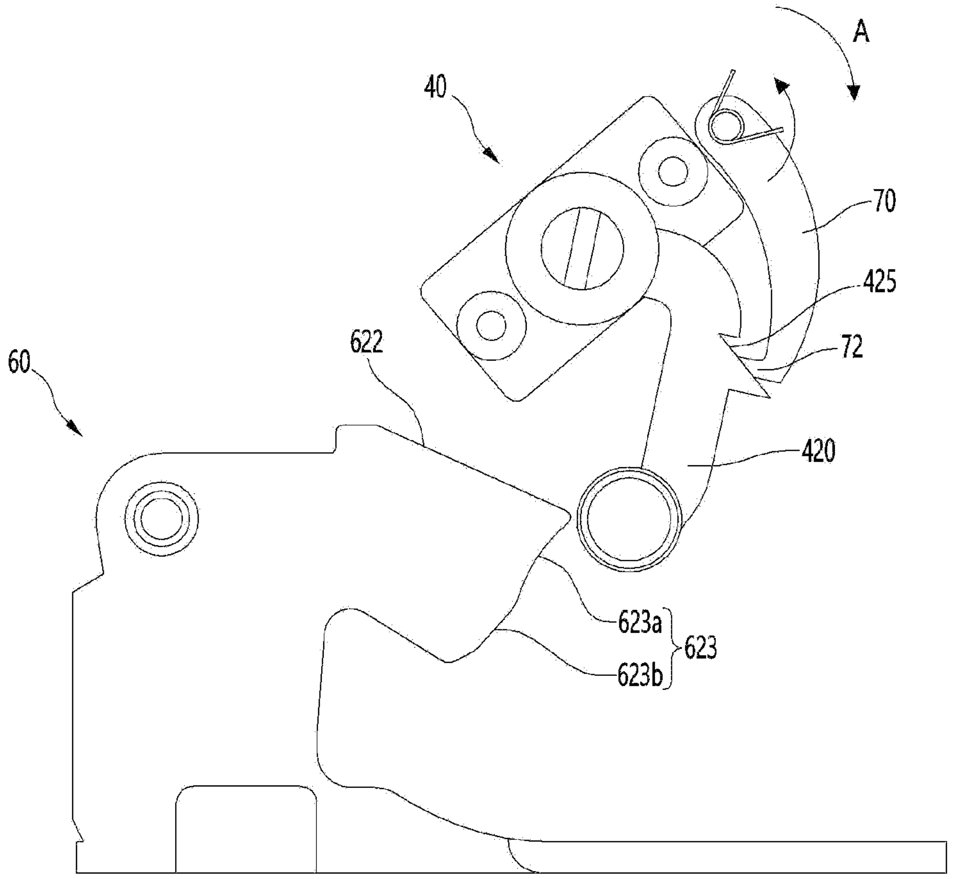
FIG. 22 is a view illustrating relative positions of the hinge bracket, the lever, and the locking member in a state in which the first door rotates at a second angle according to another embodiment.

FIG. 21 is a view illustrating relative positions of the hinge bracket, the lever, and the locking member in a state in which the first door rotates at an angle greater than the reference angle according to another embodiment, and FIG. 22 is a view illustrating relative positions of the hinge bracket, the lever, and the locking member in a state in which the first door rotates at a second angle according to another embodiment.

Figure 23:
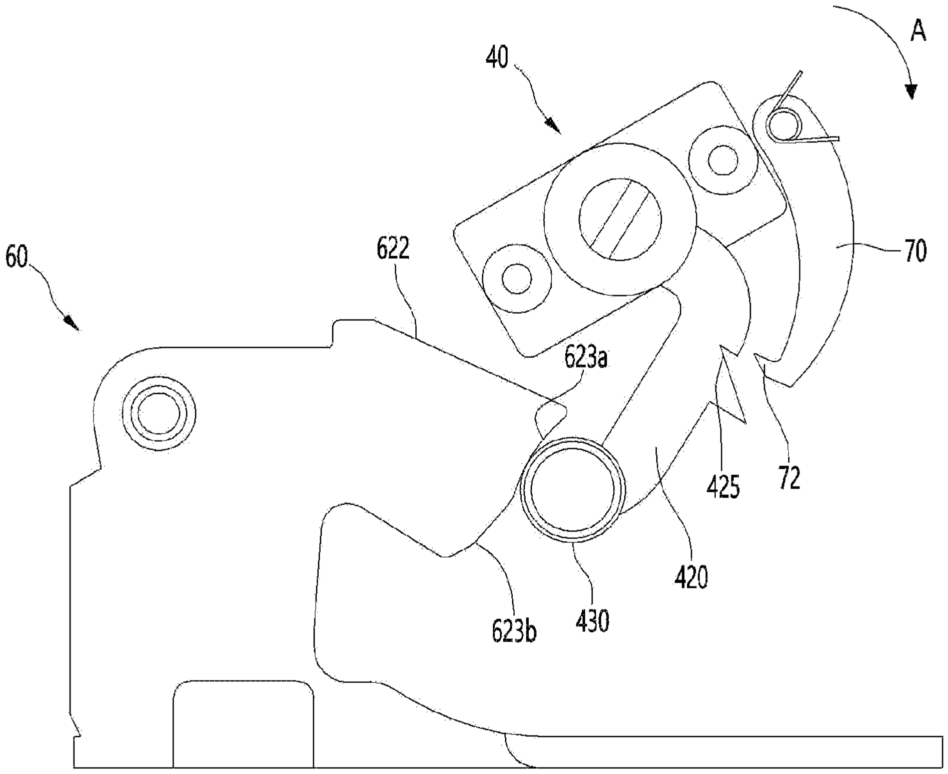
FIG. 23 is a view illustrating relative positions of the hinge bracket, the lever, and the locking member in a state in which the first door rotates at an angle less than the second angle according to another embodiment.
Figure 24:
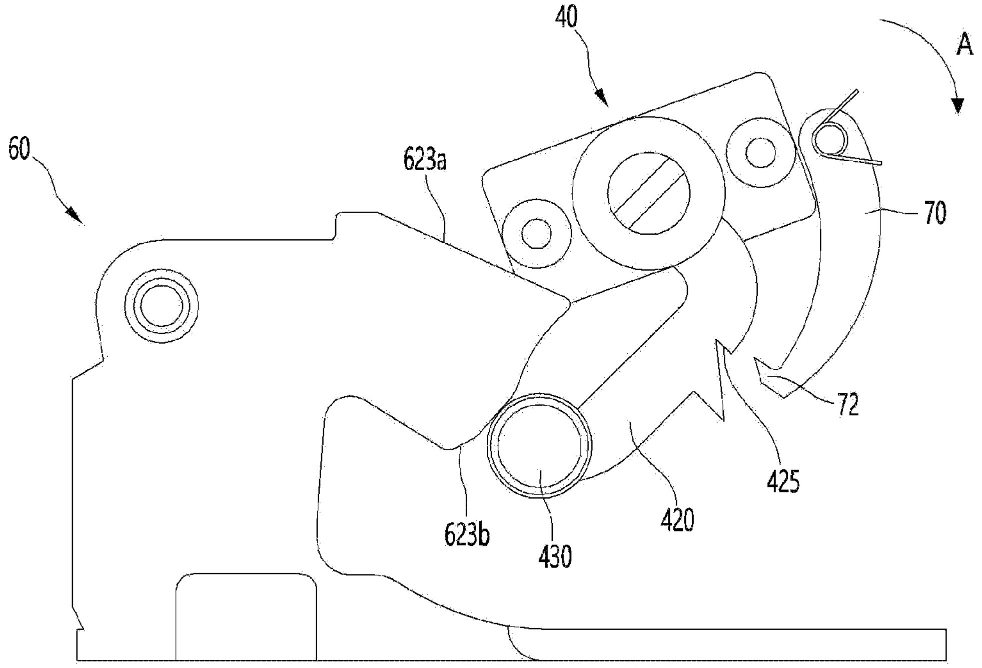
FIG. 24 is a view illustrating relative positions of the hinge bracket, the lever, and the locking member in a state in which the first door is closed according to another embodiment.

FIG. 23 is a view illustrating relative positions of the hinge bracket, the lever, and the locking member in a state in which the first door rotates at an angle less than the second angle according to another embodiment, and FIG. 24 is a view illustrating relative positions of the hinge bracket, the lever, and the locking member in a state in which the first door is closed according to another embodiment.

Referring to FIGS. 18 and 21 to 24, in a state in which the first door 21 is opened at an angle greater than a reference angle, a hook 72 of the locking member 70 may be maintained in a state of being inserted into the locking groove 425 of the lever 420 in a state in which the elastic member 450 accumulates elastic force. In this state, the rotation of the lever 420 is restricted.

As illustrated 21, in the state in which the hook 72 of the locking member 70 is inserted into the locking groove 425 of the lever 420, the locking member 70 may be in contact the body 410 and rotates so as to be restricted in rotation thereof. That is, the body 410 may serve as a stopper to limit the rotation of the locking member 70 in the locking direction. Thus, when the locking member 70 is in contact with the body 410 during rotation in an unlocking direction after rotating in the unlocking direction, the locking member 70 may be stopped.

Next, in the process of closing the first door 21 in a direction A, when an angle between the first door 21 and the front surface 10*a* of the cabinet 10 is less than the reference angle, the lever 420 may be in contact with the first surface 622. Here, the lever 420 may be first in contact with a portion of the first surface 622, which is disposed adjacent to the second surface 623.

When the first door 21 additionally rotates in the direction A in the state in which the lever 420 is in contact with the first surface 622, the lever 420 may pass through a boundary between the first surface 622 and the second surface 623, and the lever 420 may rotate (rotate in a counterclockwise direction with respect to the first body in the drawing) in a direction in which the elastic force of the elastic member 450 increases.

When the lever 420 rotates in the counterclockwise direction, the lever 420 may rotate the locking member 70 so that the locking member 70 rotates in the counterclockwise direction in the drawing, and the hook 72 of the locking member 70 gets out of the locking groove 425. In the state in which the hook 72 of the locking member 70 gets out of the locking groove 425, the rotation of the lever 420 may be possible.

When the lever 420 rotates in the counterclockwise direction, the rotation angle of the locking member 70 may increase more than the rotation angle of the lever 420 by a protrusion 424. The reason is for preventing the hook 72 of the locking member 70 from being inserted into the locking groove 425 when the lever 420 rotates in a clockwise direction so as to automatically close the first door 21.

In addition, when the second surface 623 adjacent to the first surface 622 includes a concave surface 623*a*, while the lever 420 passes through the boundary between the first surface 622 and the second surface 623 to move along the concave surface 623*a*, a difference in rotational speed between the lever 420 and the locking member 70 may occur to prevent the hook 72 of the locking member 70 from being inserted into the groove 425.

When the first door 21 additionally rotates in the direction A in the state in which the lever 420 is in contact with the concave surface 623*a*, the lever 420 may be in contact with the convex surface 623*b*. The convex surface 623*b* may serve as a damper to reduce the rotational speed of the lever 420.

In the process of moving along the concave surface 623*a*, the rotational speed of the lever 420 may increase. When the rotational speed of the lever 420 increases, the closing speed of the first door 21 may increase.

If the lever 420 moves along the concave surface 623*a* and then is directly in contact with the third surface 624, noise may occur during the process of closing the first door 21. However, if the convex surface 623*b* is present after the concave surface 623A, the rotation speed of the lever 420 may be reduced to reduce a closing speed of the first door 21, thereby reducing the closing speed of the first door 21. Therefore, the noise that may occur when the first door 21 is closed may be removed.

Finally, when the lever 420 passes through the convex surface 623*b* and then is in contact the third surface 624 as illustrated in FIG. 18, the first door 21 may be completely closed.

In this embodiment as well, in the state in which the first door 21 is opened at the angle greater than the reference angle, the lever 420 may be locked in the state in which the elastic member 450 may accumulate the elastic force, and thus, since the user only needs to manually close the first door 21 by the angle that is necessary to unlock the lever 420, there may be the advantage that the user closes the first door 21 with little effort.

The invention claimed is:

1. A refrigerator comprising:
a cabinet having a storage space;
a hinge bracket coupled to the cabinet;
a door rotatably coupled to a shaft provided on the hinge bracket and configured to open and close the storage space;
a body fixedly coupled to the door;
a lever rotatable with respect to the body at the door and configured to rotate around a rotational axis spaced apart from a rotational axis of the door;
a first elastic member connected to the lever at the door; and
a latch provided at the door and configured to restrict a rotation of the lever with respect to the body such that the first elastic member accumulates elastic force while the door is being opened.

2. The refrigerator of claim 1, wherein the latch is rotatably provided on the lever and is configured to be coupled to the body while the door is being opened.

3. The refrigerator of claim 2, wherein the latch is configured to release from the body while the door is being closed.

4. The refrigerator of claim 2, wherein the rotational axis of the lever extends in a first direction, and a rotational axis of the latch extends in a second direction crossing the first direction.

5. The refrigerator of claim 2, wherein
the lever includes an opening through which the latch passes, and
the body includes a locking groove into which a portion of the latch is accommodated.

6. The refrigerator of claim 5, further comprising a sliding block slidably provided on the lever,
wherein when the door is being closed while the latch is initially inserted into the locking groove, the latch is configured to be rotated in an unlocking direction by the sliding block so that the latch moves out of the locking groove.

7. The refrigerator of claim 6, further comprising a second elastic member configured to provide elastic force to the latch in a direction opposite to the unlocking direction.

8. The refrigerator of claim 6,
wherein the hinge bracket includes:
a coupling plate coupled to the cabinet;
a bracket body extending in a horizontal direction from the coupling plate; and
a protruding pin protruding from the bracket body, and
wherein the lever includes a pin slot in which the protruding pin is accommodated.

9. The refrigerator of claim 8, wherein the pin slot extends in a longitudinal direction of the lever.

10. The refrigerator of claim 8, further comprising a third elastic member configured to apply elastic force to the sliding block,
wherein, when an external force is not applied to the sliding block, a portion of the sliding block is positioned in the pin slot due to the elastic force of the third elastic member.

11. The refrigerator of claim 10, wherein, when the door is being closed after the door is opened at a reference angle or more, the protruding pin is positioned in the pin slot so that the protruding pin presses the sliding block and positions the sliding block to allow the latch to rotate in the unlocking direction.

12. The refrigerator of claim 8, wherein
the lever includes a rib slot configured to guide a movement of the sliding block, and
the sliding block includes a guide rib inserted into the rib slot.

13. The refrigerator of claim 8, wherein
the latch is rotatably connected to the lever by a latch shaft, and
the latch shaft is connected to the lever at a position below the sliding block.

14. The refrigerator of claim 6, wherein the sliding block moves along the lever in a direction crossing the rotational axis of the lever.

15. The refrigerator of claim 1, further comprising a connector configured to connect the first elastic member to the lever,
wherein a portion of the connector passes through the body and another portion of the connector is connected to the lever, and
the latch is installed on the lever to rotate together with the lever.

16. The refrigerator of claim 1,
wherein
the hinge bracket includes a protruding pin, and in a state in which the latch restricts the rotation of the lever with respect to the body, the lever is spaced apart from the protruding pin.

17. The refrigerator of claim 1, wherein:
the body defines an opening to receive the first elastic member and includes an extension, and
the extension includes a coupling hole through which the body is connected to the door.

18. The refrigerator of claim 1, wherein:
the first elastic member includes a first end coupled to the body, and a second end coupled to the lever, and
while the door is being opened, the first end of the first elastic member moves together with the body and the door, and the second end of the first elastic member does not move due to the latch restricting the rotation of the lever.

19. A refrigerator comprising:
a cabinet having a storage space;
a hinge bracket coupled to the cabinet and including a shaft and a pin that is spaced apart from the shaft;
a door rotatably coupled to the shaft of the hinge bracket to open and close the storage space;
a lever rotatable with respect to the pin of the hinge bracket;
an elastic member having a first end coupled to the lever; and
a latch configured to restrict a rotation of the lever with respect to the door while the door is being opened, and to allow the rotation of the lever with respect to the door while the door is being closed, wherein in a state in which the latch restricts the rotation of the lever with respect to the door, the lever is spaced apart from the pin.

20. A refrigerator comprising:

a cabinet having a storage space;

a hinge bracket coupled to the cabinet and including a shaft and a pin;

a door rotatably coupled to the shaft to open and close the storage space;

a body coupled to the door and including a locking groove;

a lever rotatable with respect to the pin of the hinge bracket;

an elastic member coupled to the body and the lever;

a latch rotatably coupled to the lever and configured to rotate into the locking groove while the door is being opened; and a block slidably provided in the lever, the block being configured to contact and move the latch from locking groove while the door is being closed.

* * * * *